United States Patent [19]

Mitobe et al.

[11] Patent Number: 5,765,372
[45] Date of Patent: Jun. 16, 1998

[54] LEAN BURN ENGINE FOR AUTOMOBILE

[75] Inventors: Noriaki Mitobe; Isao Shimizu, both of Higashihiroshima; Kunitomo Minamitani, Kure; Yasuyoshi Hori, Kobe; Futoshi Nishioka, Hiroshima; Tetsushi Hosokai, Kure; Kenji Oka, Aki-gun; Hideshi Terao, Higashihiroshima; Misao Fujimoto, Higashihiroshima; Masaki Harada, Higashihiroshima, all of Japan

[73] Assignee: Mazda Motor Corporation, Hiroshima-ken, Japan

[21] Appl. No.: 523,675

[22] Filed: Sep. 5, 1995

[30] Foreign Application Priority Data

Sep. 6, 1994 [JP] Japan .................. 6-239436
Mar. 17, 1995 [JP] Japan .................. 7-059397

[51] Int. Cl.⁶ .................................................. F01N 3/28
[52] U.S. Cl. .................. 60/301; 60/313; 123/184.53; 123/585
[58] Field of Search ............... 60/301, 313; 123/585, 123/184.53

[56] References Cited

U.S. PATENT DOCUMENTS 5,088,454  2/1992  Washizu .................. 123/184.53
5,205,120  4/1993  Oblander .................. 123/585
5,501,074  3/1996  Suetsugu .................. 60/301

FOREIGN PATENT DOCUMENTS 59-208141  11/1984  Japan.

OTHER PUBLICATIONS

Society of Automotive Engineers of Japan Inc., "Advanced Collection of Papers No. 924, vol. 2 for Cientific Lecture Meeting", Paper No. 924068 entitled Development of a New Generation Lean Burn Engine published Oct. 1, 1992.

Primary Examiner—Douglas Hart
Attorney, Agent, or Firm—Morrison & Foerster LLP

[57] ABSTRACT

A lean burn engine adapted to establish a specified air-fuel ratio leaner by predetermined rate than a stoichiometric air-fuel ratio in a range of low engine speeds and low engine loads is provided with an air intake system of a low speed type which provides a high charging efficiency in a range of low engine speeds and an exhaust system capable of eliminating a nitrogen oxide emission in the exhaust even during lean burning.

19 Claims, 20 Drawing Sheets

LEAN BURN ENGINE FOR AUTOMOBILE

BACKGROUND OF THE INVENTION

1. Field of the Invention

The present invention relates to a lean burn engine for an automobile which performs lean burning in a specific range of engine operating conditions so as to save fuel consumption.

2. Description of Related Art

In recent years, various lean burn engines which burns a lean fuel mixture in a range of low engine speeds and low engine loads have been developed. Since a lean fuel mixture contains an excessive amount of air in relation to fuel, such a lean burn engine provides not only a decrease in what is called a pumping loss which refers, in particular, to a loss due to a negative pressure resistance occurring in an intake stroke, but also a drop in the temperature of a burned gas, which yields a reduction in both heat loss, which refers to heat energy deprived from the combustion chamber and its surroundings by a cooling system, and exhaust loss. The reduction in these pumping loss and heat loss raises the thermal efficiency of an engine, a reduction in fuel consumption is realized. In the course of developing lean burn engines, various efforts have been made to improve the accuracy of air-fuel ratio control and combustibility in an attempt to burn a leaner fuel mixture accompanied by improvement of emission controls.

One such effort is that described in Japanese Laid-Open Patent Publication No. 59-208141. The approach used was to utilize a lean sensor in a lean fuel mixture control system which provides an output signal approximately proportional to the oxygen content of exhaust. In the lean fuel mixture control system, the accuracy of air-fuel ratio control is improved by feedback controlling an air-fuel ratio according to an output signal from the lean sensor and establishes and corrects a target value of controlling the output of the lean sensor according to an intended air-fuel ratio.

Another approach is to, on one hand, raise the lean limit of a fuel mixture by enhancing a swirl and, on the other hand, burn a fuel mixture as lean as possible above the limit to control or alleviate emissions, such as oxides of nitrogen (NOx), sufficiently low. Such a lean burn engine is described in the paper entitled "Development of a New Generation Lean Burn Engine" (paper No. 924068) by Jun Harada et al in Advanced Collection of Papers No. 924, Vol. 2 for Scientific Lecture Meeting published Oct. 1, 1992 by Society of Automotive Engineers of Japan Inc. These teachings allude to lean burning in a relatively narrow range of low engine speeds and low engine loads where there is no demand for high engine torque.

In order to enhance even more fuel efficiency, it is essential to spread the range of engine operating conditions for lean burning. With regard to spreading the lean burn range of engine operating conditions, the lean burn engines described in the above publications have problems to be solved concerning a raise in engine torque and alleviation of an emission of nitrogen oxides.

In the above-described paper, the lean burn engine produces an emission of nitrogen oxides (NOx) which shows the greatest proportion in the exhaust for an air-fuel ration of 16 and tends to reduce the proportion of nitrogen oxides (NOx) in the exhaust as a fuel mixture becomes lean. Besides, while a catalytic convertor rhodium (CCRO) typically utilized in exhaust purifying systems exhibits a high efficiency of purifying nitrogen oxides (NOx) for an ideal or stoichiometric fuel mixture whose air-fuel ratio is 14.7, nevertheless, it is not always endowed with the effect of nitrogen oxide (NOx) purification for a fuel mixture leaner than the stoichiometric fuel mixture. For this reason, in order for the prior art lean burn engine to be allowed to burn a highly lean fuel mixture with an alleviated proportion of an emission of nitrogen oxides (NOx), it is essential to elevate a lean limit of air fuel ratio to approximately 20 so that the lean burn engine produces a sufficiently reduced proportion of the emission of nitrogen oxides (NOx). However, such a highly lean fuel mixture imposes a serious constraint upon engine output torque and must encounter limited engine output torque. Accordingly, the prior art lean burn engine must, on one hand, perform lean burning in such a range of low engine speeds and low engine loads that demanded output torque is produced and, on one hand, burn a fuel mixture at the stoichiometric fuel mixture or richer in a range of high engine loads so as to generate sufficient torque and reduce a nitrogen oxide (NOx) emission in the range. In this instance, in order for the prior lean burn engine to expand the lean burn range of engine operating conditions, it is essential to elevate available torque for a highly lean fuel mixture. It is thought that the range of engine operating conditions for a fuel mixture leaner than the stoichiometric fuel mixture is broadened by gradually reducing the proportion of fuel in a fuel mixture at engine loads on a side higher the range of engine loads in which demanded engine torque is given for the highly lean fuel mixture while procuring engine torque as high as possible. However, this leads to an increased amount of a nitrogen oxide (NOx) emission which is always undesirable.

Another problem in developing efficient lean burn engines is fuel efficiency in a transitional period of engine operating conditions such as acceleration. Since the prior art lean burn engine suspends the lean burning upon a occurrence of acceleration even in a lean burn range of engine operating conditions for the purpose of assuring engine torque. Such suspension is not always desirable for the lean burn engine in view of fuel efficiency. Further, if there is only a narrow band between the limit of air-fuel ratio for a permissible amount of a nitrogen oxide (NOx) emission and the lean limit of air-fuel ratio, an air-fuel ratio exceeds these limits according to driving conditions due to a change in air-fuel ratio during control, a variance in air-fuel ratio among cylinders and/or variable distribution of a fuel mixture in a combustion chamber. This also leads to a necessity of elevating the lean limit of air-fuel ratio.

Further, much attention have been given to various approaches relating to torque increasing techniques which involve improvement of the combustibility of a fuel mixture in an combustion chamber and enhancement of the output characteristics of engines. Various efforts have been made to mechanical structure of intake and exhaust systems and configuration of the combustion chamber. One such effort is that described in, for instance, Japanese Unexamined Patent Publication No. 5-106451. In the lean burn engine, the intake system is adapted so as to produce a swirl in a combustion chamber by means of air introduced through a primary intake port when a secondary intake port is closed. If the lean burn engine includes intake and exhaust valves adapted to be opened and shut at a predetermined certain timing, the period of time assigned a piston between a time at which the intake valve reaches bottom dead center (BDC) on an intake stroke and a time of closing of the intake valve is approximately the same as that assigned the exhaust valve between a time at which the exhaust valve starts to open and a time at which the piston reaches bottom dead center (BDC)

on an exhaust stroke. That is, if there is a demand for an increase in engine output torque in a range of low engine speeds, the intake and exhaust valves are driven at a timing suitable for a low speed type of air intake system so as to open for approximately a same short period of time from or to BDC. On the other hand, if there is a demand for an increase in engine output torque in a range of high engine speeds, the intake and exhaust valves are driven at a timing suitable for a high speed type of air intake system so as to open for approximately a same long period of time from or to BDC. While the lean burn engine of this type is difficult to provide an increase in engine output torque both in the low engine speed range and in the high engine speed range. Further, the lean burn engine, which changes the valve timing according to engine operating conditions so as to provide an increase in engine output torque according to ranges of engine speeds, makes a valve timing change mechanism and valve timing control difficult and troublesome.

Some types of lean burn engines, such as described in the above-described Publication No. 4-208141, are provided with assist air supply systems for supplying air to fuel injectors of the respective cylinders. Such an assist air supply system is activated during cold engine operation to supply air so as to expedite or accelerate atomization of fuel, thereby improving the combustibility of fuel. The lean burn engine of this type is effective to atomize fuel efficiently during cold engine operation in which the amount of fuel to be delivered must be increased and reduce emissions such as hydrocarbons (HC), nitrogen oxides (NOx) and carbon monoxide (CO) which generally increase due to an increase in the amount of fuel delivered. However, the lean burn engine does not make utilization of the assist air supply system at all for the purpose of reducing a nitrogen oxide (NOx) emission. This is because it has been understood that expedited fuel combustion, which is realized by the supply of assist air, leads to an increase in the amount of nitrogen oxide (NOx) emission in the exhaust and, accordingly, the utilization of an assist air supply system is inconsistent with a demand for a reduction of nitrogen oxide (NOx) emission.

Another type of lean burn engines, such as described in, for instance, Japanese Unexamined Patent Publication No. 4-350352, is provided with fuel vapor supply systems for introducing fuel vapor into an intake system so as to supply it into a combustion chamber. The lean burn engine described in Japanese Unexamined Patent Publication makes utilization of an assist air supply system for supplying fuel vapor as well as compressed assist air. Specifically, the assist air supply system includes a compression pump with an suction port thereof connected to a purge pipe of a canister so as to deliver fuel vapor to an air assisted fuel injector as well as compressed assist air. This teaching alludes alternatively to introducing fuel vapor into a surge tank of the intake system.

Typically, in order for lean burn engines provided with fuel vapor treating systems to keep the stability of combustion, fuel vapor is not utilized in a range of engine operating conditions where a highly lean fuel mixture is available. With such a lean burn engine, fuel vapor excessive over the capacity of a canister is discharged into atmosphere during lean burning, leading aggravation of practical fuel consumption efficiency. While it is desired to deliver fuel vapor into the combustion chamber even during lean burning, nevertheless various constraints must be imposed upon the uniform distribution of fuel vapor among the respective cylinders which has an influence on a change in engine output torque and the stratification of a fuel mixture in the combustion chamber which has an influence on a lean limit of an air-fuel ratio.

SUMMARY OF THE INVENTION

It is an object of the present invention to provide a lean burn engine which assures its output torque in a widened lean burn range of engine operating conditions and provides a sufficient reduction in the amount of a nitrogen oxide (NOx) emission.

It is another object of the present invention to provide a lean burn engine which can yield an increase in engine output torque in a range of low engine speeds while assuring sufficient engine output torque in a range of high engine speeds.

It is another object of the present invention to provide a lean burn engine which improves the combustibility of fuel during lean burning accompanied by a reduction in the amount of a nitrogen oxide (NOx) emission in the exhaust.

It is still another object of the present invention to provide a lean burn engine in which fuel vapor is available in a range of engine operating conditions where a fuel mixture is delivered at a highly lean air-fuel ratio close to a lean burn limits of an air-fuel ratio so as to improve practical fuel consumption efficiency and, in addition, assures the reliable stability of fuel combustion and stratification of a lean fuel mixture, thereby elevating a lean limit of an air-fuel ratio.

The above objects of the present invention are achieved by providing a lean burn engine for an automobile which controls a fuel mixture at a specified air-fuel ratio, in a range of low engine speeds and low engine loads, leaner by a predetermined rate than a stoichiometric air-fuel ratio so as to produce an nitrogen oxide emission of a proportion in the exhaust less than a predetermined level and cause a change in its output torque less than a permissible level and, in a range of high engine loads, equal to or richer than the stoichiometric air-fuel ratio, and which is provided with an air intake system of a low speed type which causes an increase in charging efficiency in a range of low engine speeds and an exhaust system capable of eliminating a nitrogen oxide emission in the exhaust produced even during burning a fuel mixture leaner than a stoichiometric fuel mixture. The air-fuel ratio is established, in the range of low engine speeds, to be lean in a specific range of engine operating conditions extending on a side of engine loads higher than an engine load near a limit load in a range of engine loads in which an increase in engine torque is caused at the specified air-fuel ratio in the range of low engine speeds where the air intake system causes an increase in charging efficiency and, at a side of higher engine loads in the specific range of engine operating conditions, to become gradually smaller within a specified extent as an increase in engine load occurs.

The lean burn engine thus structured charges air at an increased charging efficiency in the range of low engine speeds and, consequently yields an elevated limit of output torque during lean burning. In assistance with the exhaust purifying device, such as a catalytic convertor comprising at least one of platinum, iridium and rhodium an activator beard by zeolite as a carrier, which is capable of eliminating a nitrogen oxide emission in the exhaust produced from a fuel mixture leaner than a stoichiometric fuel mixture, even if the air-fuel ratio reaches near the stoichiometric air-fuel ratio rather far from a lean air-fuel ratio enabling the lean burn engine suitable for the lean burn engine to reduce sufficiently the amount of nitrogen oxide emission, the lean burn engine yields a reduction in the amount of nitrogen oxide emission. These low speed intake air system and exhaust purifying system are complementary to each other so as to elevate the limit of engine torque during lean burning. Accordingly, while the lean burn engine extends a range of engine operating conditions for lean burning on a side of higher engine loads without yielding an increase in the amount of nitrogen oxide emission in the exhaust.

A fuel mixture may be controlled at a lean air-fuel ratio in the specified lean burn range of engine operating conditions during transitional engine operation, such as acceleration, in addition during ordinary engine operation. In this instance, while the lean burn engine preserves high fuel consumption efficiency and well controlled emissions during acceleration, it improves charging efficiency so as to assure demand output torque.

Further, a fuel mixture may be controlled at the specified air-fuel ratio in a range of engine loads where intake air saturates involved in the specified lean burn range of engine operating conditions and increased in amount within a specified extent with an increase in opening of a throttle valve on a side of higher engine loads than the range of engine loads. In this instance, the range of low engine speeds and low engine loads where the specified highly lean air-fuel ratio is created is expanded to an extent which allows the lean burn engine to produce the greatest output torque available at the specified lean air-fuel ratio. Further, an increased amount of fuel mixture is delivered in a range of engine operating conditions for air-fuel ratios leaner than the stoichiometric air-fuel ratio, providing an increase in engine output torque and, consequently, improving fuel consumption efficiency.

The specified lean burn range of engine operating conditions is defined by an opening of at most approximately ⅝ relative to a full opening of the throttle valve. The lean burn range of engine operating conditions close to the full throttle allows the lean burn engine to be widely used not only during street driving but also during highland driving.

The air intake system produces a turbulence flow of fuel in the combustion chamber by the first intake port when the second intake port opening is closed in the specific lean burn range of low engine speeds so as to improve the combustibility of the fuel during lean burning. The first intake port is desirably configured so as to form the turbulence flow of fuel having a center line intersecting to a vertical center line of the combustion chamber at an angle between 35° and 55°. The first intake port thus configured produces an enhanced, spiral swirl in the form of a complex turbulence consisting of a tumble (a vertical turbulence flow) and a swirl (a horizontal eddy flow) in the combustion chamber 2 which is always desirable to provide uniform distribution of a fuel mixture suitable for lean burning and, consequently, improve the combustibility of fuel during lean burning.

The low speed type of air intake system is configured so that a dynamic effect of intake air effective when the second intake port is closed is tunable at an engine speed in the specific lean burn range of low engine speeds so as to increase engine output torque due to an increased charging efficiency during lean burning. Especially, a dynamic effect of intake air may be tunable at an engine speed on a higher speed side of the specific lean burn range of low engine speeds. In this instance, an increase in charging efficiency is caused in the range of high engine speeds where there is a demand for high engine output torque.

Such a dynamic effect is produced by a resonance chamber, provided in the air intake system, which has a volumetric capacity larger than a surge tank. The resonance chamber is configured so as to present a dynamic effect of intake air in a range of engine speeds between said engine speeds at which said dynamic effect of intake air is tunable when said second intake port is closed and when said second intake port is opened, respectively. prevents a torque down in a range between a tunable engine speed when the second intake port is closed and a tunable engine speed when the second intake port is opened.

An intake valve of the slow speed type of intake air system is timed to close so as to increase charging efficiency in the specific lean burn range of slow engine speeds. Similarly, an exhaust valve of the fast speed type of exhaust system is timed to open so as to expedite exhausting a burned gas in a range of high engine speeds. In particular, the exhaust valve starts to open before a period of time from bottom dead center (BDC) on an exhaust stroke which is 10 degree in terms of crank angle longer than a period of time from bottom dead center on an intake stroke after which the intake valve starts to close. while the lean burn engine including the intake and exhaust systems thus timed expands the specific lean burn range of engine operating conditions, where lean burning is performed with an alleviated emission of nitrogen oxides, toward a side of higher engine loads, it increases charging efficiency and, consequently, yields an increase in output torque in the range of low engine speeds and improves the speed of combustion due to a turbulence flow of fuel mixture. As a result, even though the exhaust valve starts early to open, the lean burn engine does not cause an energy loss and a torque drop in the range of high engine speeds.

The intake air system further may include an intake air control means for controlling the amount of intake air bypassing a throttle valve according to engine operating conditions of the specific lean burn range of engine operating conditions so as to introduce an increased amount of intake air, thereby making up for a lack of engine output torque.

A fuel injector may be of an air mixing type which delivers assist air so as to atomize efficiently a fuel injected. While the lean burn engine including the air mixing type of fuel injector expands the specific lean burn range of engine operating conditions, where lean burning is performed with a well controlled emission of nitrogen oxides, toward a side of higher engine loads, it causes uniform distribution of a fuel mixture due to atomization of the fuel, so as to yield a great reduction in the amount of an nitrogen oxide emission during lean burning.

Further, fuel vapor is supplied to the air mixing type fuel injector by a fuel vapor purge system. This enables the lean burn engine to deliver uniformly the fuel vapor into the respective cylinders, preventing the lean burn engine from suffering a drop in output torque during lean burning. These air mixing type fuel injectors for the respective cylinders are timed to inject fuel at a specified timing on an intake stroke, so as to ensure proper stratification of a fuel mixture in each of the cylinders, thereby improving the combustibility of the fuel mixture during lean burning.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
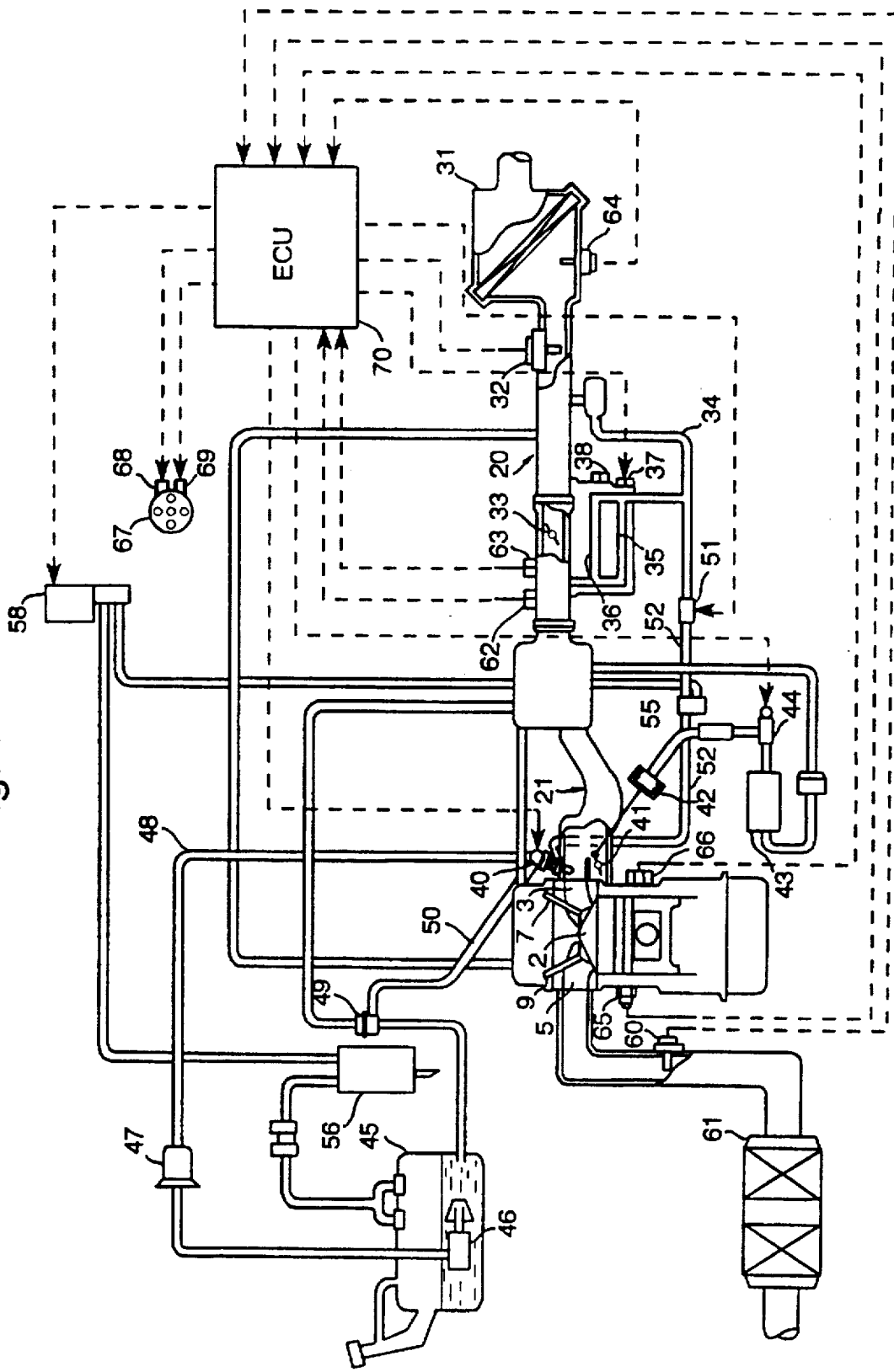
FIG. 1 is a schematic illustration of a lean burn engine according to a preferred embodiment of the present invention.

Referring now to the drawings in detail, and in particular, to FIG. 1 showing schematically a lean burn engine 1, for instance an in-line, four cylinder internal combustion engine, according to a preferred embodiment of the present invention, an intake system 20 and an exhaust system 58 cooperate with the engine 1. The engine 1 has first and second intake ports 3 and 4 opening into a wedge type of combustion chamber 2 of each of cylinders (only one of which is shown) and first or primary and second or secondary intake ports 5 and 6 opening into the combustion chamber 2. The intake ports 3 and 4 and the exhaust ports 5 and 6 are opened and shut at a predetermined timing by intake valves 7 and 8 and exhaust valves 9 and 10, respectively. These intake valves 7 and 8 and exhaust valves 9 and 10 are driven directly by an overhead camshaft type of valve drive mechanism.

Air is introduced into the combustion chamber 2 through a common intake pipe 30 and an intake manifold 21 connected to the common intake pipe 30 through a surge tank 22. The common intake pipe 30 is provided with an air cleaner 31, a thermal type of air flow sensor 32 and a throttle valve 33 in order from the upstream end. A bypass pipe 34 branches off from and rejoins the common intake pipe 30 so as to allow air to bypass the throttle valve 33. The bypass pipe 34 is provided with an air pipe 35 and an air pipe 36. An idle speed control (ISC) valve 37, which is operated by a duty solenoid (not shown), regulates the amount of air flowing through the air pipe 35 so as to control the amount of intake air introduced into the combustion chamber 2 during idling. A thermal type of valve 38 causes an increase in the amount of air flowing through the air pipe 36 according to temperature when the engine 1 is cold so as to increase the amount of intake air introduced into the combustion chamber 2. The intake pipe 30 is further provided with a fuel injector 40 positioned in close proximity to either one of the intake ports 3 and 4, namely the intake port 3 in this instance, and an air flow control valve 41, which is otherwise called a tumble/swirl control (TSC) valve, positioned in close proximity to another intake port 4. This tumble/swirl control (TSC) valve 41 is operated by an actuator 42 responsive to negative pressure so as to control a tumble and a swirl, i.e. induction turbulence. In order to supply a negative pressure to the actuator 42 and discharge it, there are provided a vacuum tank 43 is connected between the actuator 42 and the surge tank 22 so as to introduce a negative pressure from the surge tank 22 into the actuator 42 and an electromagnetic valve 44 disposed between the vacuum tank 43 and the actuator 42 so as to control supply and discharge of the negative pressure.

The fuel injector 40 of what is called an air mixing type of injector (AMI) atomizes a fuel to fine particles by delivering air around a nozzle of the fuel injector 40. A fuel supply system includes a fuel pump 46, disposed in a fuel tank 45, which delivers a fuel from the fuel tank 45 to the fuel injector 40 through a fuel pipe 48 provided with a filter 47. An excessive fuel is returned from the fuel injector 40 to the fuel tank 45 through a return pipe 50 provided with a pressure regulator 49. This fuel supply system cooperates with an assist air and fuel vapor supply system which will be described later.

The exhaust system 58 includes an exhaust pipe 59 provided with an oxygen ($O_2$) sensor 60 forming a part of an air-fuel ratio control system and a catalytic convertor 61. The oxygen ($O_2$) sensor 60 generates an output approximately proportional to the oxygen content of exhaust so that the air-fuel ratio control system determines the proper air-fuel ratio and constantly monitors its exhaust to verify the accuracy of the mixture setting. The catalytic convertor 62 purifies exhaust or removing emissions, in particular, hydrocarbons (HC), nitrogen oxides (NOx) and carbon monoxide (CO) which can pose a health problem for the nation if uncontrolled.

In addition to the air flow sensor 32 and the oxygen ($O_2$) sensor 60, the air-fuel ratio control system includes a throttle position sensor 62 for detecting various open positions of the throttle valve 33, an idle position sensor 63 for detecting a closed position of the throttle valve 33, a temperature sensor 64 for detecting the temperature of intake air, a temperature sensor 65 for detecting the temperature of engine cooling water, a knock sensor 66 for detecting an occurrence of engine knocking. Further, a distributor 67 is provided with an angle sensor 68 for detecting the angle of turn of an engine crank shaft (not shown) and a cylinder sensor 69 for distinguishing cylinders under firing. All of these sensors are well known to those skilled in the art and may take any known types.

An engine control unit 70 receives signals from various sensors to control the amount of fuel delivered by a given fuel injector and a timing at which the delivery of fuel is made. The engine control unit 70 further controls the idle speed control valve 37, the electromagnetic valve 44 associated with the tumble/swirl control (TSC) valve 41, and an air control valve 55 and a purge solenoid valve 58 of the assist air and fuel vapor supply system.

The catalytic convertor 61 is of the reducing type which deoxidizes nitrogen oxides (NOx) in the exhaust even after burning a fuel mixture leaner than a stoichiometric fuel mixture. For a detailed description of a representative example of such a catalytic convertor 61, reference may be had to Japanese Patent Application No. 5-126552, filed by the applicant of this application. The catalyst of the convertor 61 includes nobel metals, for instance iridium (Ir) and platinum (Pt), or iridium (Ir), platinum (Pt) and rhodium (Rh), as an activator borne by a carrier such as zeolite. The catalytic convertor 61 of this type eliminates nitrogen oxides (NOx) in exhaust efficiently and purifies the exhaust.

The following description will be directed to the mechanism of nitrogen oxide elimination in lean burning in comparison with the prior art catalytic convertor rhodium (CCRO). With the prior art catalytic convertor rhodium, when a stoichiometric fuel mixture is burned, oxygen in the burned gas is insufficient to oxidize hydrocarbons (HC) and carbon monoxide (CO) contained in the burned gas. As a result, nitrogen oxides (NOx) are decomposed into nitrogen and oxygen and the oxygen is used to oxidize hydrocarbons (HC) and carbon monoxide (CO), purifying the exhaust. However, when a lean fuel mixture is burned, the burned gas contains a large amount of oxygen sufficient to oxidize hydrocarbons (HC) and carbon monoxide (CO) in the exhaust, nitrogen oxides (NOx) stay in the exhaust as an emission.

In contradistinction to the prior art catalytic convertor rhodium, the reducing type of catalytic convertor 61 captures a large amount of hydrocarbons (HC) in the carrier zeolite, which is porous, and makes the noble metals as an activator adsorb nitrogen oxides (NOx) thereto. Further, even when a burned gas contains a large amount of oxygen, the catalytic convertor 61 cause a chemical reaction of the hydrocarbons (HC) in the carrier zeolite react to the nitrogen oxides (NOx) absorbed to the activator, so as to decompose the nitrogen oxides (NOx), thereby purifying the exhaust. In this way, the catalytic convertor 61 eliminates nitrogen oxides in a burned gas even when a lean fuel mixture burns. In this instance, iridium (Ir) has an effect to change activator nobel metals into fine articles so as to improve the exhaust purification efficiency of the catalytic convertor 61 and yield an improved durability of the catalytic convertor 61.

There has been developed a catalyst which accumulates nitrogen oxides (NOx) when a lean fuel mixture is burned and decomposes the nitrogen oxides (NOx) when a stoichiometric fuel mixture is burned. This catalyst can not afford to accumulate nitrogen oxides (NOx) if lean burning continues for a long time, suffering a deterioration in nitrogen oxide elimination efficiency. In contradistinction to this catalyst, the reducing type of catalytic convertor 61 maintains its high nitrogen oxide elimination efficiency even when a long time of lean burning occurs.

Figure 2:
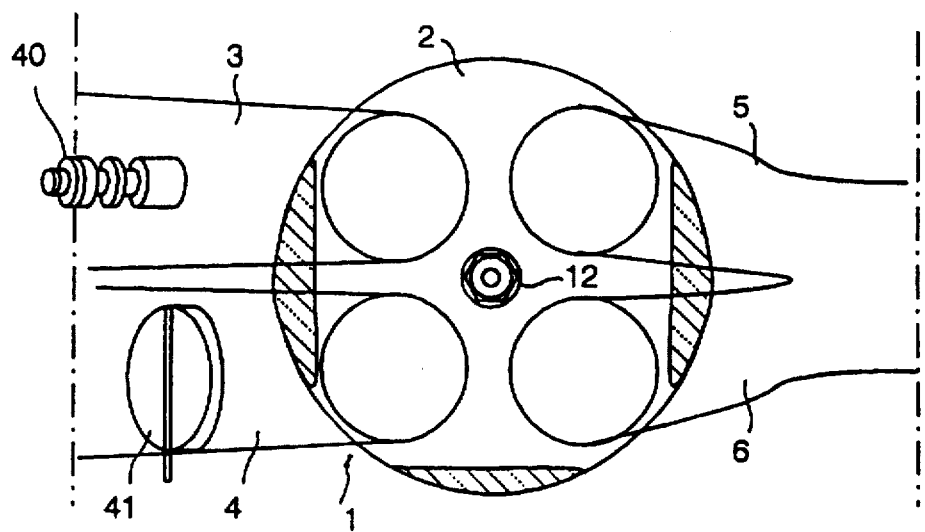
FIG. 2 is a schematic plan view of a combustion chamber of the lean burn engine.
Figure 3:
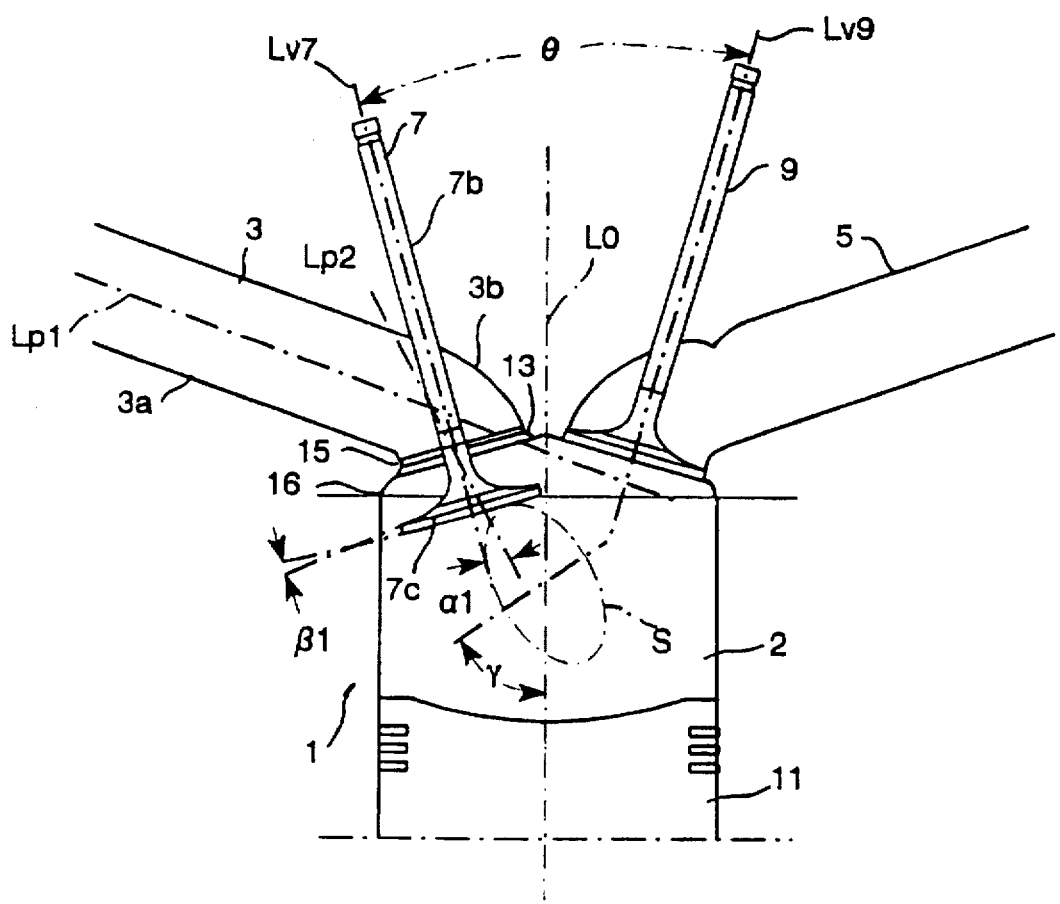
FIG. 3 is a schematic cross-sectional view of the combustion chamber of the lean burn engine including a primary intake port.
Figure 4:
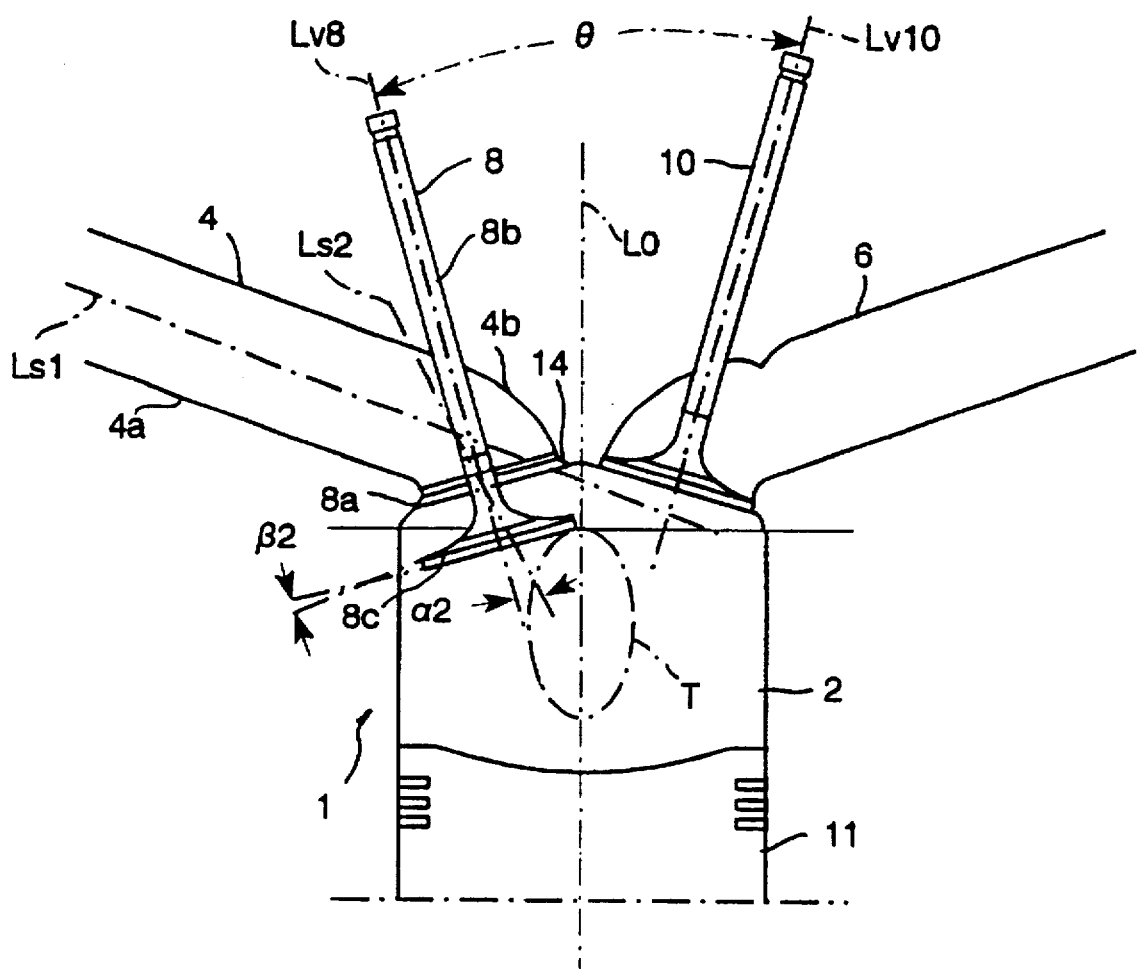
FIG. 4 is a schematic cross-sectional view of the combustion chamber of the lean burn engine including a secondary intake port.

Referring to FIGS. 2-4 showing a detailed structure of the engine relating to lean burning, the engine 1 delivers a fuel mixture into the combustion chamber 2 of each cylinder through the first and second intake ports 3 and 4 basically when the intake valves 7 and 8 open the first and second intake ports 3 and 4, respectively, in an intake stroke. After compressing the fuel mixture by a piston 11 in an compression stroke, a spark plug 12 fires the fuel mixture. Thereafter, in an exhaust stroke, the exhaust valves 9 and 10 open the first and second exhaust ports 5, respectively, and 6 to force a burned gas out of the combustion chamber 2. The intake ports 3 and 4 are configured and positioned in relation to the combustion chamber 2 so as to produce a strong and slanting spiral swirl in the form of a complex turbulence consisting of a tumble (a vertical turbulence flow) and a swirl (a horizontal turbulence flow) in the combustion chamber 2. Specifically, the primary intake port 3 consists of a straight port portion 3a having a straight port center line $Lp_1$ and extending upstream as viewed in the direction of an intake air flow and a throat portion 3b having a throat center line $Lp_2$ and bending downstream to a valve seat 13 from the straight port portion 3a. Similarly, the secondary intake port 4 consists of a straight port portion 4a having a straight port center line $Ls_1$ and extending upstream as viewed in the direction of an intake air flow and a throat portion 4b having a throat center line $Ls_2$ and bending downstream to a valve seat 14 from the straight port portion 4a. The straight port portion 3a is configured so that an extension of the straight port center line $Lp_1$ of the straight port portion 3a passes between the valve seat 13 and a point of the valve head 7a in most close proximity to the vertical center of the combustion chamber 2 at the largest valve lift. Similarly, the straight port portion 4a is configured so that an extension of a straight port center line $Ls_1$ of the straight port portion 4a passes between the valve seat 14 and a point of the valve head 8a in most close proximity to the vertical center line LO of the combustion chamber 2 at the given valve lift. The intake ports 3 and 4 thus configured enables intake air with low air flow resistance. In this instance, the extensions of the straight port center lines $Lp_1$ and $Ls_1$ of the straight port portions 3a and 4a are desirable to pass centers of the valve seats 13 and 14, respectively.

The combustion chamber 2 is configured to be of what is called a pent roof lens type and is formed with the intake ports 3 and 4 and the exhaust ports 5 and 6 which are most suitably configured so that valve center lines $Lv_7$ and $Lv_9$ of the intake valve 7 and the exhaust valve 9 and valve center lines $Lv_8$ and $Lv_{10}$ of the intake valve 8 and the exhaust valve 10 intersect at angles θ of approximately 30°. The primary intake port 3 is further configured to have a primary throat offset angle α1, which refers to an angle formed between the valve center line $Lv_7$ and the throat center line $Lp_2$, larger than a secondary throat offset angle α2 of the secondary intake port 4, which refers to an angle formed between the valve center line $Lv_8$ and the throat center line Ls₂. For instance, these primary and secondary throat angles α1 and α2 are set to approximately 30° and 12°, respectively. With the configuration of the primary intake port 3, when intake air is introduced through the primary intake port 3 only, there is produced a turbulence flow of fuel S, having an inclination angle γ of approximately 35° to 55° with respect to the vertical center line LO, in the combustion chamber 2. On the other hand, the secondary intake port 4 thus configured produces a tumble of intake air T in the combustion chamber 2.

The intake valves 7 and 8 consist of the valve heads 7a and 8a having bottom surfaces directed in parallel with a roof surface of the wedge type combustion chamber 2 and valve stems 7b and 8b, respectively. The valve head 7a of the intake valve 7 is configured to have its valve face angle β1 of the valve head larger than a valve face angle β2 of the intake valve 8. In other words, the valve seat 13 of the primary intake port 3 has a valve seat angle larger than that of the valve seat 14 of the secondary intake port 4. The intake valves 7 and 8 thus configured provide a passageway between the valve head 7a and the throat portion 3b of the primary intake port 3 wider than between the valve head 8a and the throat portion 4b of the secondary intake port 4. Due to this valve configuration, the primary intake port 3 has an effect of accelerating an intake air flow introduced therethrough, and the secondary intake port 4 has an effect of assuring a necessary amount of intake air. While, in order for intake air to flow at a high speed, the primary intake port 3 may be configured so as to have a narrow throat portion, nevertheless, it is not always desirable in view of air flow resistance. In order to produce a hard blow toward the exhaust valves 9 and 10, the primary intake port 3 has a port edge 15 on a periphery of its exit opening and the combustion chamber 2 is formed with a squash area 16 around the exit opening of the primary intake port 3.

According to the engine thus structured, the primary intake port 3 produces strong, complex turbulence consisting of a tumble and a swirl in the combustion chamber 2, so that, even during lean burning in which tends to cause slow combustion of a lean fuel mixture, uniform distribution of a fuel mixture and an improved combustion speed are realized at once, providing satisfactory combustion of a lean fuel mixture.

Figure 5:
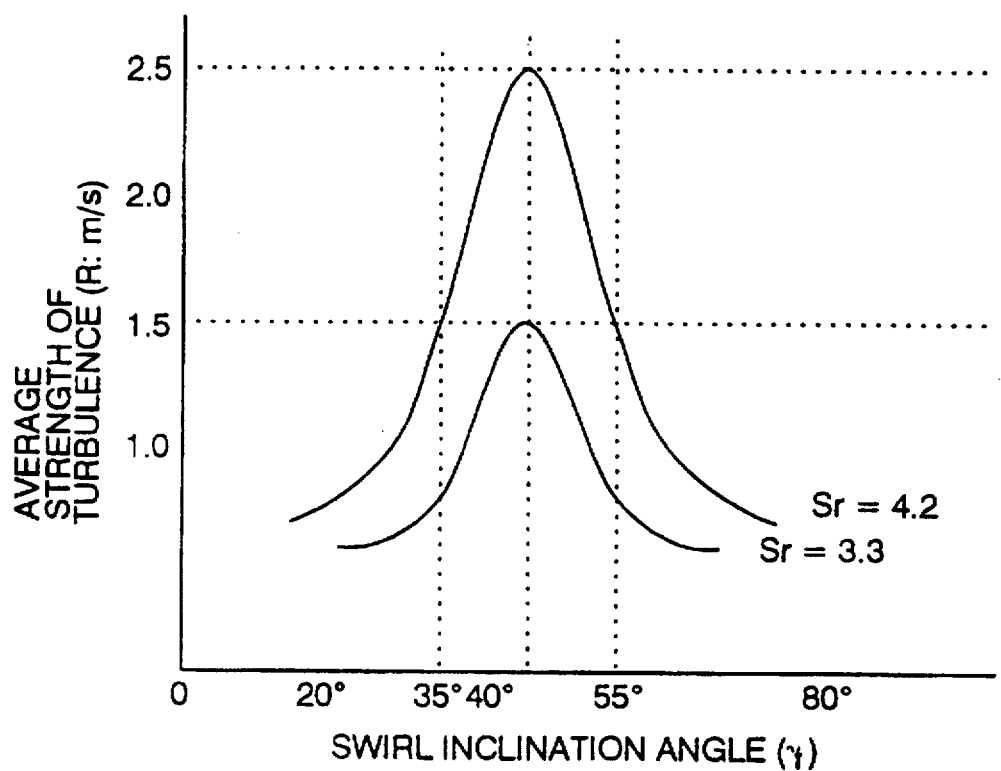
FIG. 5 is a graph showing the average strength of turbulence of a fuel mixture.
Figure 6:
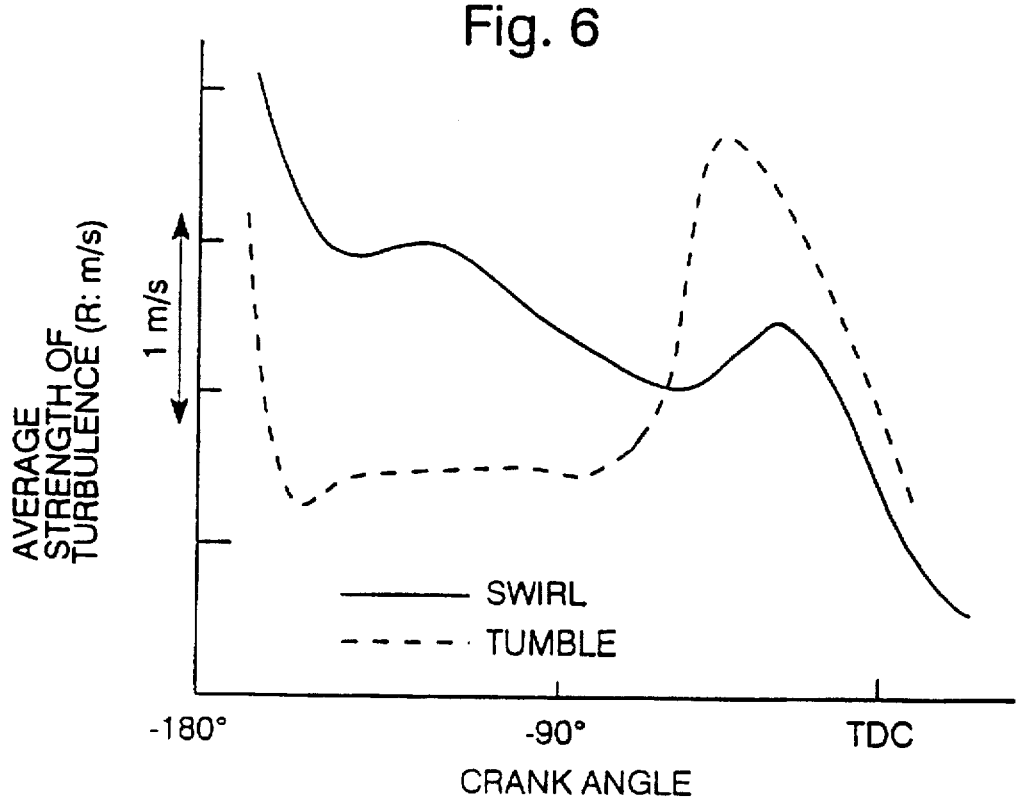
FIG. 6 is a graph showing the average strength of intake air relating to a tumble and a swirl.

As shown in FIG. 6 showing the average strength of turbulence of a fuel mixture in the combustion chamber, it is typical that, while a swirl is strongly disturbed for a period from an intake stoke to a first half of a compression stroke and, consequently, brings an immediate effect on uniform distribution of a fuel mixture, it is, however, rather faint in turbulence for a period of the latter half of the compression stroke. In contradistinction to a swirl, a tumble is faint in turbulence for a period of a first half of a compression stroke but strong for the latter half of the compression stroke. According to the engine formed with the intake ports 3 and structured as above, the average strength of turbulence of a fuel mixture is enhanced over a period from an intake stroke to a compression stroke owing to a contribution of both of a swirl and a tumble. FIG. 5 shows the relationship between swirl inclination angle γ and average turbulence strength R for swirl ratios Sr of 3.3 and 4.2. As seen in FIG. 5, the average strength of turbulence of a fuel mixture is greatly enhanced by forming a swirl having an inclination angle γ of approximately 35° to 55°, desirably approximately 45°, and a swirl ratio Sr higher than 3, providing an improved uniform distribution of a fuel mixture and enabling the fuel mixture to burn quickly.

The swirl ratio Sr is defined and obtained as follows.

Figure 7:
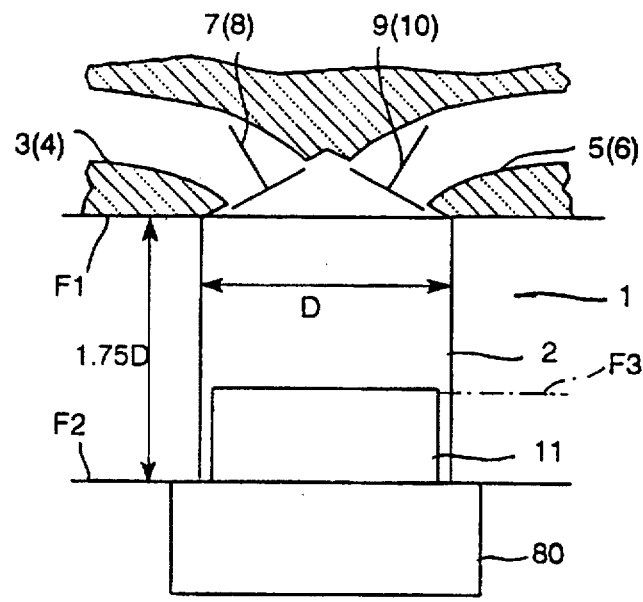
FIG. 7 is a schematic illustration showing measurement of a swirl.

Typically, the swirl ratio Sr is defined as a number of the number of circular movements of a horizontal turbulence flow of a fuel mixture generated in a combustion chamber divided by the number of rotation of an engine. The number of circular movements of a horizontal turbulence flow is operated based on what is called impulse swirl torque by a method well known to those skilled in the art. Such impulse swirl torque is obtained as torque imparted to and detected by an impulse swirl meter. For instance, as shown in FIG. 7, if the engine 1 has a cylinder with a diameter of D, the impulse swirl meter 80 is placed in a position $F_2$ at a distance from the under surface $F_1$ of the cylinder head 1.75 times as long as the diameter D. In FIG. 7, a reference $F_3$ indicates the piston top surface of a piston 11 at bottom dead center (BDC) on a stroke. In measurement of the impulse swirl torque, the impulse swirl meter 80 is placed in the position $F_2$ at the distance 1.75 D from the cylinder head under surface $F_1$ and reproduces the energy of a swirl acting on the piston top of the piston 11 so as to find the energy of circular movement ordinarily existing near the top surface $F_3$ of the piston 11. The impulse swirl meter 80 is provided with a number of honeycombs to which force in a flowing direction of a swirl is imparted. Impulse swirl torque G is obtained by integrating the force acting on the respective honeycombs.

Specifically, assuming that a fuel mixture is continuously introduced into the combustion chamber 2 till the piston reaches BDC from the commencement of opening of the intake valves 7 and 8, the fuel mixture moves circularly along the inner wall of the combustion chamber 2 for that period and reaches the highest speed of circular movement when the piston reaches BDC. Accordingly, a swirl ratio Sr is found by integrating every angular momentum per a unit angle of motion of the crankshaft in the period. Based on this experimental knowledge, the swirl ratio Sr is given in this embodiment by the following equations:

$$Sr = \eta v \cdot \{D \cdot S \cdot \int (cf \cdot Nr \cdot d\alpha)\} / \{n \cdot d^2 \cdot d \cdot \alpha (\int cf \cdot d\alpha)^2\} \quad (1)$$

$$Nr = 8 \cdot G / (M \cdot D \cdot V_0) \quad (2)$$

where $\eta v$ is the volumetric efficiency (=1);

S is the stroke of the piston;

n is the number of intake valves;

d is the diameter of an intake port throat;

c is the flow coefficient with respect to each valve lift;

N is the dimensionless rig swirl value with respect to each valve lift;

α is the crank angle;

G is the impulse swirl torque;

M is the amount of air charged in the cylinder in an intake stroke; and $V_0$ is the piston head speed.

The above equation (2) is introduced as follows:

$$G = I \cdot \omega r \quad (3)$$

$$I = M \cdot D^2 / 8 \quad (4)$$

Substituting the equation (4) into the equation (3)

$$G = M \cdot D^2 \cdot \omega r / 8 \quad (5)$$

From the equation (5)

$$D \cdot \omega r = 8 \cdot G (M/D) \quad (6)$$

And since $$Nr = D \cdot \omega r / V_0 \quad (7)$$

From the equations (6) and (7)

$$Nr = 8 \cdot G/(M \cdot D \cdot V_0)$$

In the above equations, I is the inertial moment of air in the cylinder at the end of an intake stroke (BDC) and ωr is the rig swirl value.

With the primary and secondary intake ports 3 and 4 and intake valves 7 and 8 configured as shown in FIGS. 2–4, the swirl ratio Sr and swirl inclination angle are established as above so as to raise the average strength of turbulence. In addition, because the primary and secondary intake ports 3 and 4 and intake valves 7 and 8 are configured so that the valve face angle β1 of the valve head of the intake valve 7 is larger than a valve face angle β2 of the valve head of the intake valve 8, the speed of intake air flow through the primary intake port 3 is increased and the flow coefficient of intake air through the primary intake port 3 is restrained to be small, making a contribution to increasing the air charging efficiency.

In order to increase the speed of fuel combustion to a certain extent without harming ignitability, the average strength of turbulence is desirable to be between 1.5 and 2.5 m/s. In addition, in order for a lean fuel mixture to shorten a combustion time, the combustion chamber 2 is configured to be compact so as to have a small surface-volume (S/V) ratio and, consequently, establish a flame propagation distance as short as possible. In this connection, a lean burn, four cycle double over head camshaft engine as an exemplar has dimensions of a displacement of 1,500 cc, a bore diameter of 75 mm, a piston stroke of 84 mm and a compression ratio of 9.4. While the compression ratio is desired to be high in view of thermal efficiency, it is determined in consideration of improvement in knocking margin and emission control.

Figure 8:
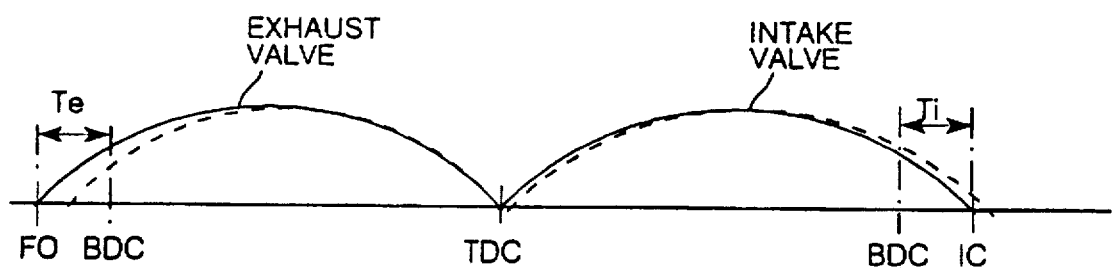
FIG. 8 is a valve timing diagram

Referring to FIG. 8 showing a valve timing diagram which indicates a valve timing of the engine 1 by a solid line and a valve timing of the prior art engine by a broken line. The exhaust valve 9, 10 starts to open before a bottom dead center (BDC) on an exhaust stroke and closes near top dead center (TDC) on the exhaust stroke. On the other hand, the intake valve 7, 8 starts to open near top dead center (TDC) on an intake stroke and closes after bottom dead center (BDC) on the intake stroke. Specifically, in this instance, the intake valve 7, 8 closes relatively earlier at a time IC after a short period Ti from BDC on the intake stroke, which is called a slow speed type which is timed to close so as to increase the amount of intake air in a range of low engine speeds so as to alleviate a back-blow of intake air. The exhaust valve 9, 10 opens relatively earlier at a time EO before a relatively long period Te from BDC on the exhaust stroke, which is called a fast speed type which is timed to open so as to expedite exhausting a burned gas in a range of high engine speeds. Further, the period Te between the exhaust valve opening time EO and BDC on an exhaust stroke is 10 degrees as represented in terms of cam angle larger than the period Ti between the intake valve closing time IC and BDC on an intake stroke. For instance, a valve timing is set such that the exhaust valve opens at a time EO 50 degrees in terms of cam angle before BDC and closes at a time of TDC and the intake valve opens at a time of TDC and closes at a time IC 33 degrees in terms of cam angle after BDC. These times or cam angles are defined with regard to a point of a cam robe at the greatest height. As shown by a broken line, in the prior art engine, a valve timing is set such that there is almost no difference or at most 5 degrees in cam angle between a period between an exhaust opening time and BDC and a period between an intake valve closing time and BDC.

With such the valve timing of the engine 1, on one hand, the slow speed type of intake valves 7 and 8 prevent a back-blow of intake air in a range of low engine speeds, increasing the air charging efficiency and boosting engine output torque in the range of low engine speeds. On the other hand, while the exhaust valves 9 and 10 are of the fast speed type, they do not arrest the boost of engine output torque in the range of low engine speeds. This is because, in the range of slow engine speeds where the tumble/swirl control valve 41 closes, burning of a fuel mixture is accelerated by an inclined swirl produced with the assistance of the intake ports 3 and 4 structured as shown in FIGS. 2–4 and simultaneously by atomization of the fuel mixture by the air mixing type injector (AMI) 40. As a result, even though the exhaust valves open early, the energy of combustion is imparted sufficiently to the piston before the exhaust valves open and there does not occur discharge of the energy of combustion more into the exhaust ports than to the piston, so that the boost of engine output torque in the range of low engine speeds is not arrested. Furthermore, because exhausting a burned gas is expedited in the range of high engine speeds and, consequently, a pumping loss is reduced during exhausting, the fast speed type of exhaust valves make up a drop in engine output torque in the range of high engine speeds.

Figure 9:
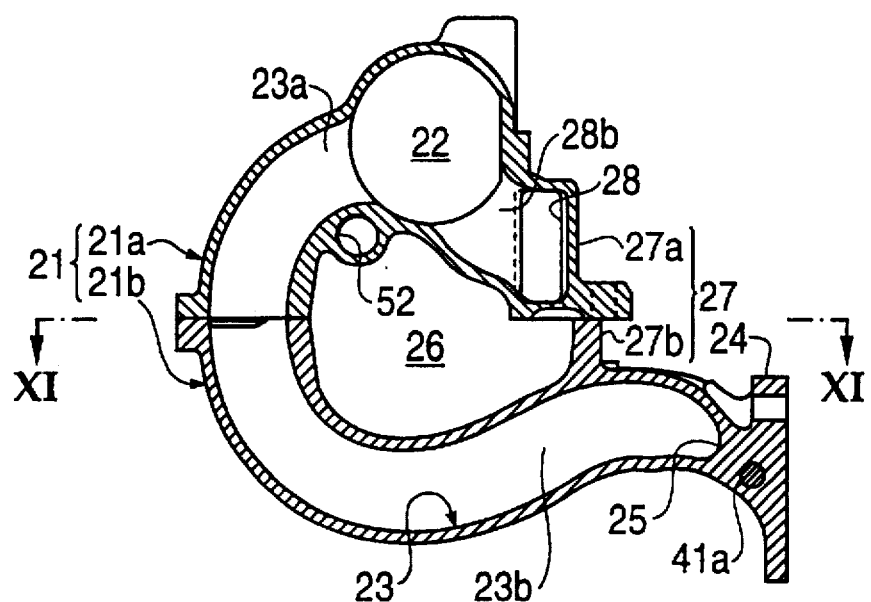
FIG. 9 is a cross sectional view of an intake manifold.
Figure 10:
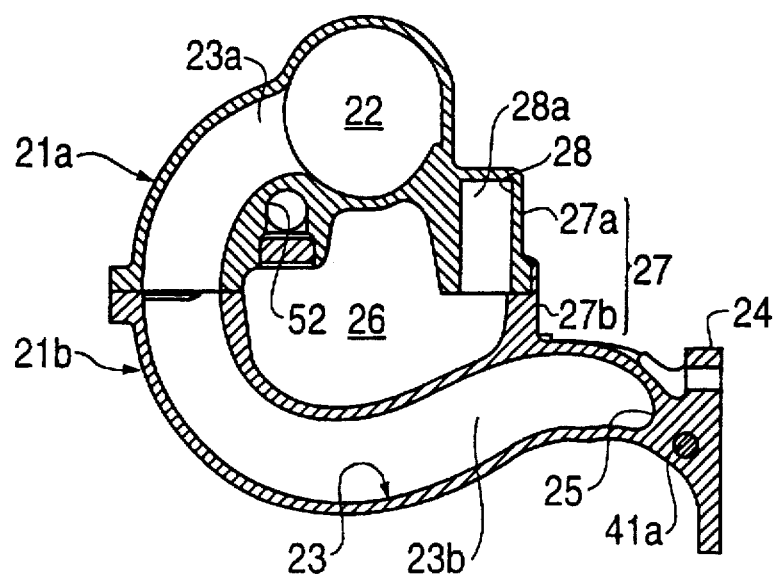
FIG. 10 is another cross sectional view of the intake manifold.
Figure 11:
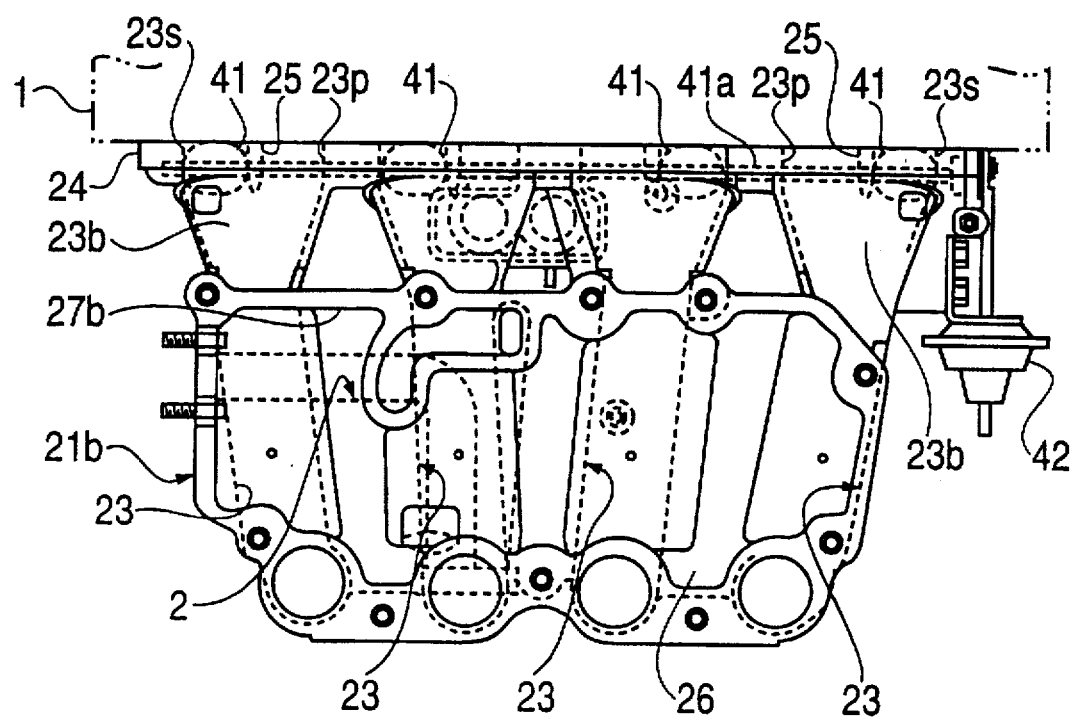
FIG. 11 is a cross sectional view of the intake manifold as viewed along a line IX—IX of FIG. 9.

FIGS. 9–11 show a detailed structure of the intake manifold 21. By adapting the intake manifold 21 to be effective in different ranges of engine operating conditions, such as high and low engine speed ranges, in which a dynamic or inertial effect of intake air is tunable, the intake manifold 21 increases the air charging efficiency in both the high and low engine speed ranges as compared with an intake manifold not adapted to change a dynamic effect of intake air. The intake manifold 21 is further provided with a resonance chamber. The provision of a resonance chamber increases engine torque in an inbetween range, resulting in yielding an increase in the entire range of low engine speeds contributory to expansion of a learn burn range of engine operating conditions.

Specifically, the intake manifold 21 comprises generally semi-circularly shaped upper half and lower half housings 21a and 21b secured to each other so as to form semi-circularly extending intake passages 23, in communication with the respective cylinders at their downstream ends, which are individual to the respective cylinders and independent from one another. The upper half housing 21a is formed with a surge tank housing integral therewith for forming a surge tank 22. The surge tank 22, to which the individual intake passages 23 are joined, extends along with a straight row of the cylinders. Each of the individual intake passages 23 consists of an upper half portion 23a formed in the upper half housing 21a and in communication with the surge tank 22 at its upstream end and a lower half portion 23b formed in the lower half housing 21b and in communication with the cylinder at its downstream end. The lower half housing 21b is formed with a flange 24 at its downstream end through which it is secured to a cylinder head of the engine 1. Intake air is introduced into the surge tank 22 after passing through a throttle body (not shown) which is secured to the upper half housing 21a. As clearly seen in FIG. 11, each individual intake passage 23 is divided by a partition wall 25 into two outlets, namely a primary outlet 23p directly communicated with the primary intake port 3 and a secondary outlet 23s directly communicated with the secondary intake port 4. The tumble/swirl control (TSC) valves 41, which are disposed within the secondary outlets 23s of the respective individual intake passage 23, are linked with the actuator 42 by a valve shaft 41a passing through the secondary outlets 23s and extending along with the straight row of the cylinders. The actuator 42 is operationally coupled to an end of the valve shaft 41a so as to open or close the tumble/swirl control (TSC) valves 41.

As clearly seen in FIGS. 9 and 10, the manifold 21 forms a generally cylindrically shaped resonance chamber 26 enclosed by the upper and lower half housings 21a and 21b. This resonance chamber 26 extends in a direction of the straight row of the cylinders and is in communication with the surge tank 22. On a side of the resonance chamber 26 adjacent to the engine 1, the manifold 21 is formed with a vertical wall 27 forming part of the resonance chamber 26. The vertical wall 27 is divided into two parts, namely an upper wall 27a integral with the upper half housing 21a and a lower wall 27b integral with the lower half housing 21b. In the upper wall 27a, there is formed with a communication passage 28 with its one end 28a opening into the resonance chamber 26 and its another end opening into the surge tank 22. A passage 52, forming a part of the assist air and fuel vapor supply system which will be described later, is formed in the upper half housing 21a of the intake manifold 21. In this instance, the resonance chamber 26 is formed larger in volumetric capacity than the surge tank 22. Further, the intake manifold 21 is configured in length and cross-sectional area such that the dynamic effect of intake air tunes in the range of low engine speeds, such as approximately 2,000 rpm, when the tumble/swirl control (TSC) valves 41 close the secondary intake ports 4, and tunes in the range of high engine speeds, such as approximately 3,500 to 4,000 rpm, when the tumble/swirl control (TSC) valves 41 open the secondary intake ports 4.

Figure 12:
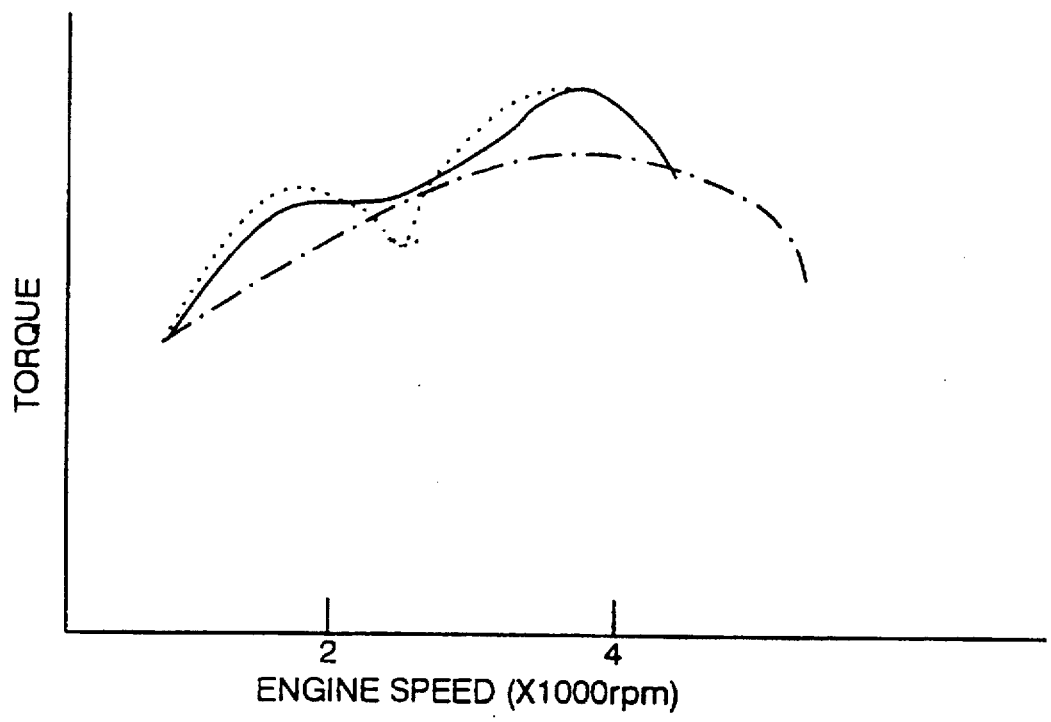
FIG. 12 is the torque characteristic of engines.

If the intake manifold 21 is designed in consideration with intake air dynamic effect tunable ranges only as described above, there occurs an increase in engine torque is achieved only in the range of low engine speeds and the range of high engine speeds as shown by a broken line in FIG. 12 and a sharp drop at an inbetween range. However, when the intake manifold 21 cooperates with the resonance chamber 26 structured so as to be in communication with and larger in volumetric capacity than the surge tank 22, the engine torque changes gently over the entire range of engine speeds as shown by a solid line in FIG. 12. This is because the resonance chamber 26 causes an increase in the air charging efficiency in the inbetween range due to its resonance effect.

Figure 13:
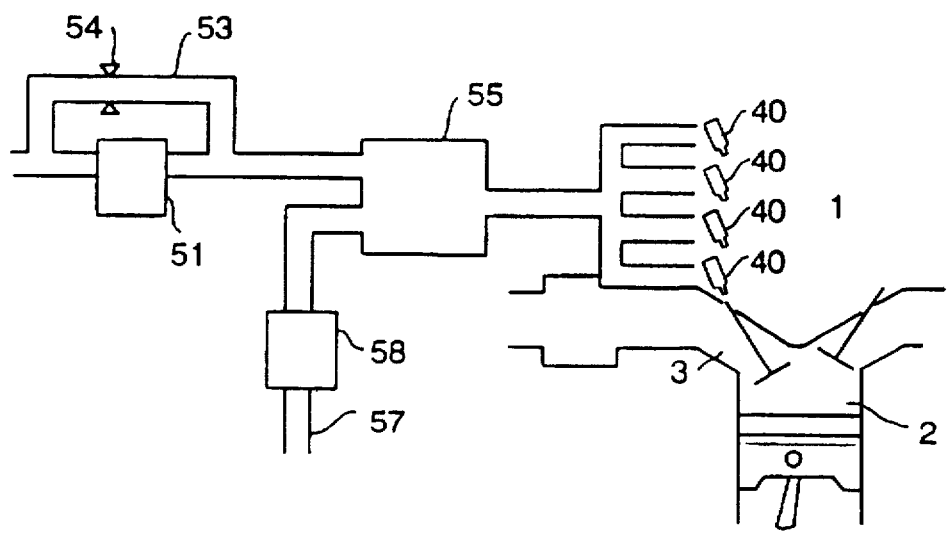
FIG. 13 is a schematic illustration showing a mixing air and fuel vapor supply system.

FIG. 13 shows schematically an assist air and fuel vapor supply system cooperating with the air mixing type injectors (AMI) 40. This assist air and fuel vapor supply system includes a mixing chamber 55 for mixing fuel vapor and air. At both sides of the mixing chamber 55, an air supply pipe 52, provided with an air control valve 51 for controlling air supply, extends from the bypass pipe 34 (see FIG. 1) to the intake manifold 21. Specifically, the air supply pipe 52 branches off at its downstream end into four individual pipes 52a connected to the injectors 40, respectively. The air control valve 51 closes the air supply pipe 52 when the engine 1 idles or operates at high loads and, otherwise, opens the air supply pipe 52 to allow air to be supplied to the injectors 40. The assist air supply pipe 52 is further provided with a bypass pipe 53 so as to allow air to flow bypassing the air control valve 51. An orifice 54 is disposed in the bypass pipe so as to allow a small amount of air during idling. The air and fuel vapor supply system further includes a fuel vapor purge pipe 57, provided with a purge valve 58, such as a solenoid valve, which extends from a canister 56 (see FIG. 1) to the mixing chamber 55. The purge valve 58 allows fuel vapor produced in the fuel tank 45 and trapped in the canister 56 to be supplied into the mixing chamber 55 when it opens. A fuel mixture of air and fuel vapor produced in the mixing chamber 55 is supplied into the respective primary intake ports 3 surrounding the injectors 40 and fed into the combustion chambers 2 as well as fuel delivered through the injectors 40 in an intake stroke.

The purge valve 58 is driven according to engine speeds and loads to deliver a predetermined amount of fuel vapor only when a predetermined fuel purge condition is satisfied, for instance when the temperature of engine cooling water is higher than a specified temperature during the feedback control of air-fuel ratio. During lean burning control, the duty rate at which the purge valve 58 is driven is changeable so as to control the purging amount of fuel vapor to be less than when the stoichiometric fuel mixture is delivered and increase a decreasing change in the purging amount of fuel vapor as the amount of intake air becomes small.

Figure 14:
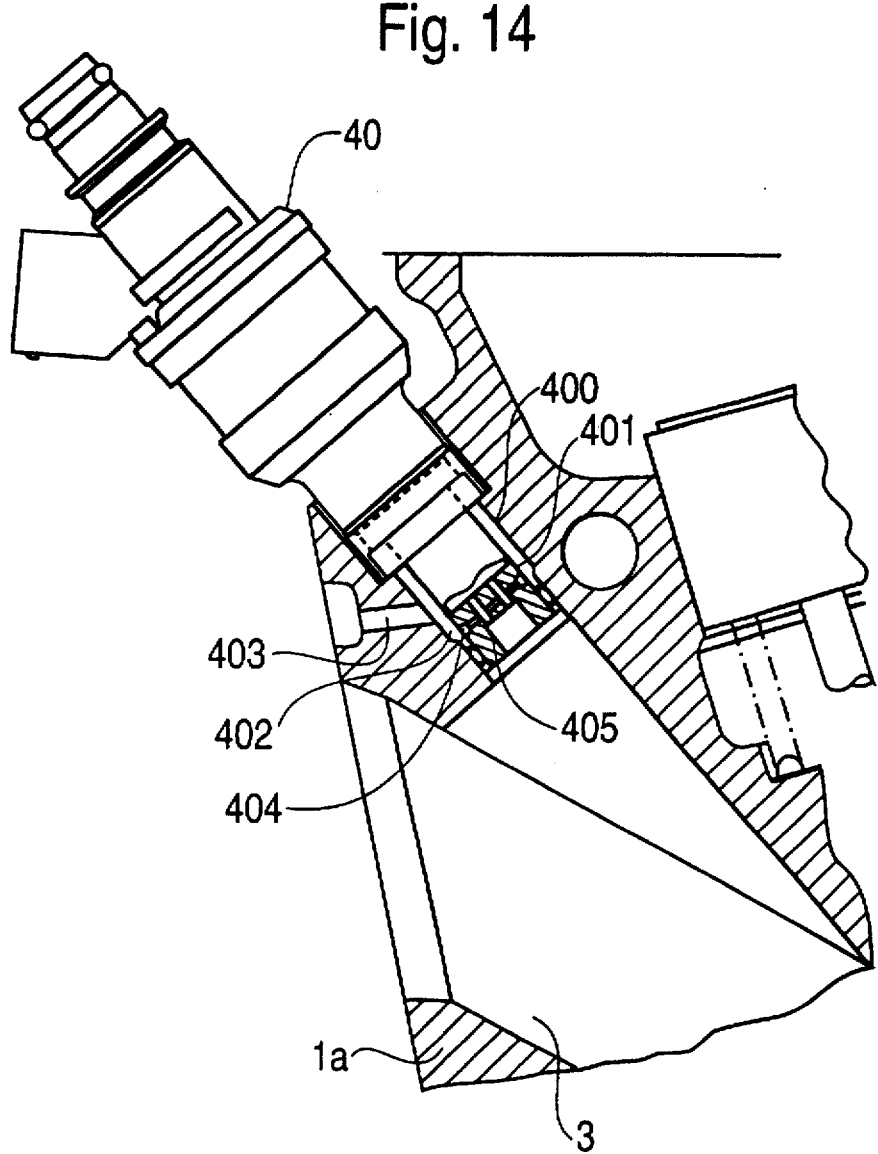
FIG. 14 is a cross-sectional view showing a detail of an air mixing type of fuel injector.
Figure 15:
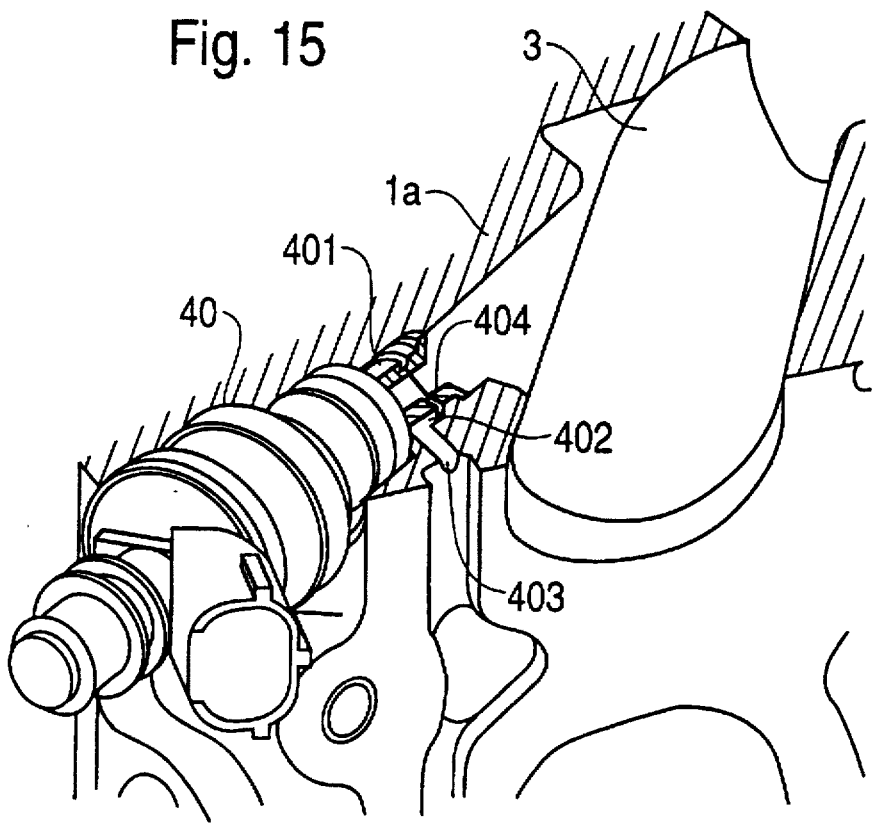
FIG. 15 is a perspective view of the air mixing type of fuel injector.

Referring to FIGS. 14 and 15 which show a detailed structure of the air mixing type injectors (AMI) 40 and part of the cylinder head 1a surrounding the air mixing type injectors (AMI) 40, the injector 40 is fitted into a bore 400 formed in the cylinder head 1a and in communication with the primary intake port 3. The injector 40 has a cylindrical partition 401 surrounding an injection nozzle (not shown) at its end. Between the inner wall of the injector fitting bore 400 and the cylindrical partition 401 of the injector 400, an annular space 402 is formed and is communicated with the individual pipe 52a of the air supply pipe 52 of the assist air and fuel vapor supply system through an air introduction port 403 formed in the cylinder head 1a so as to introduce air into the primary intake port 3 therethrough. Further, the cylindrical partition 401 is provided with air nozzles 404 radially inwardly extending so as to deliver air into a space around the end of the injector nozzle from the annular space 402. Each of these air nozzles 404 is formed with an orifice 405.

When the injector 40 delivers a fuel toward the primary intake port 3 at a predetermined timing and negative pressure is created in the space around the end of the injector nozzle by intake air, air introduced into the annular space 402 is injected into the space around the end of the injector nozzle through the orifices 405 of the air nozzles 404, so as to mix the fuel with the air. In this instance, when the purge valve 58 opens, fuel vapor is introduced into the annular space 402 and injected through the orifices 405 of the air nozzles 404.

Figure 16:
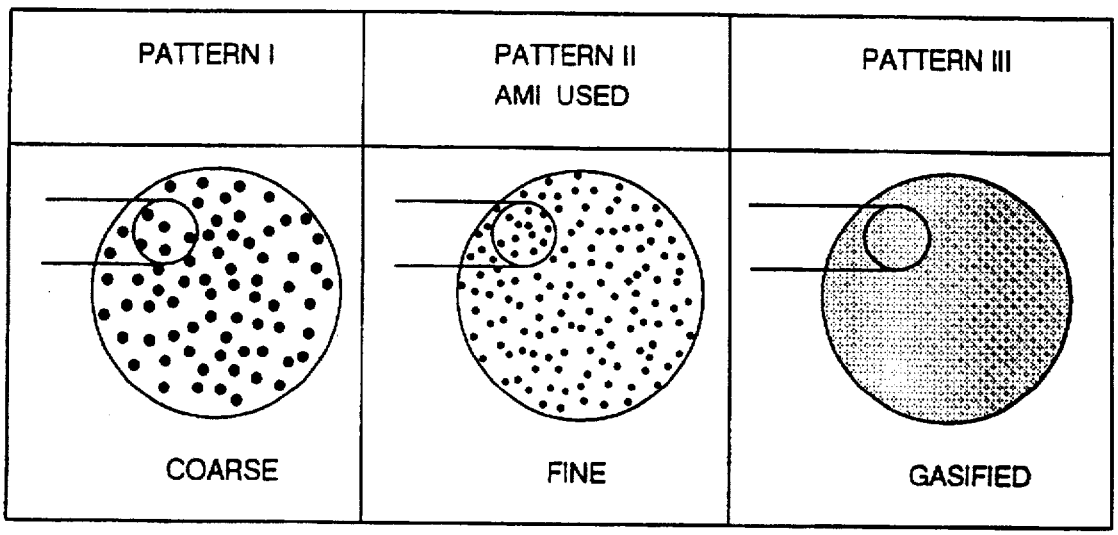
FIG. 16 is an illustration showing various fuel distribution patterns in the combustion chamber.
Figure 17:
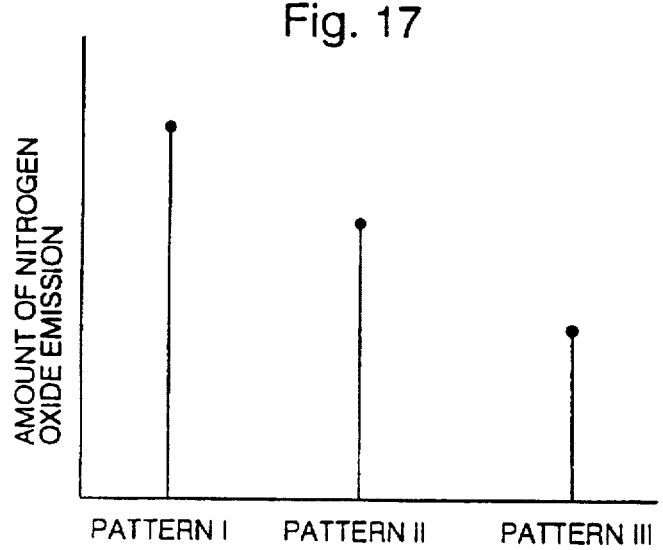
FIG. 17 is a graph of the amount of an emission of nitrogen oxides (NOx) with respect to the fuel distribution patterns.

FIG. 16 illustrates diagrammatically various fuel distribution patterns in a combustion chamber. The fuel distribution pattern in a combustion chamber is exemplify by a first pattern produced by means of an ordinary injector disposed in an intake port, a second pattern produced by means of an air mixing type injector, such as used in the above embodiment of the invention, cooperating with an air and fuel vapor supply system, a third pattern produced when a gasified fuel mixture is delivered. As understood in FIG. 16, as compared with the ordinary injector, the injector with the utilization of an air and fuel vapor supply system yields greatly improved atomization of fuel. If a lean fuel mixture contains coarse-atomized fuel, it tends to produce nitrogen oxides (NOx) in the exhaust due to an ununiform distribution of the temperature of combustion which occurs locally in the combustion chamber similarly due to an ununiform distribution of a fuel mixture. In contradistinction to this, a lean fuel mixture burns uniformly in the entire area of a combustion chamber if containing fine fuel particles, preventing an occurrence of a local distribution of the temperature of combustion and yielding a reduction in the amount of nitrogen oxides (NOx) in the exhaust. From FIG. 17 indicating a relative amount of an emission of nitrogen oxides (NOx) in the exhaust gas in regard to the first to third fuel distribution patterns, it is proved that, as compared with an ordinary injector, the injector 40 with the utilization of an air and fuel vapor supply system yields a great reduction in a nitrogen oxide emission. While gasifying a fuel mixture is effective to reduce the amount of a nitrogen oxide emission in the exhaust more than the other two, nevertheless, various constraints must be imposed on fuel gasification in the structure in which an injector is disposed in an intake port for a precise air-fuel ratio control and desired stratification of a fuel mixture by means of what is called sequential timed fuel injection.

Figure 18:
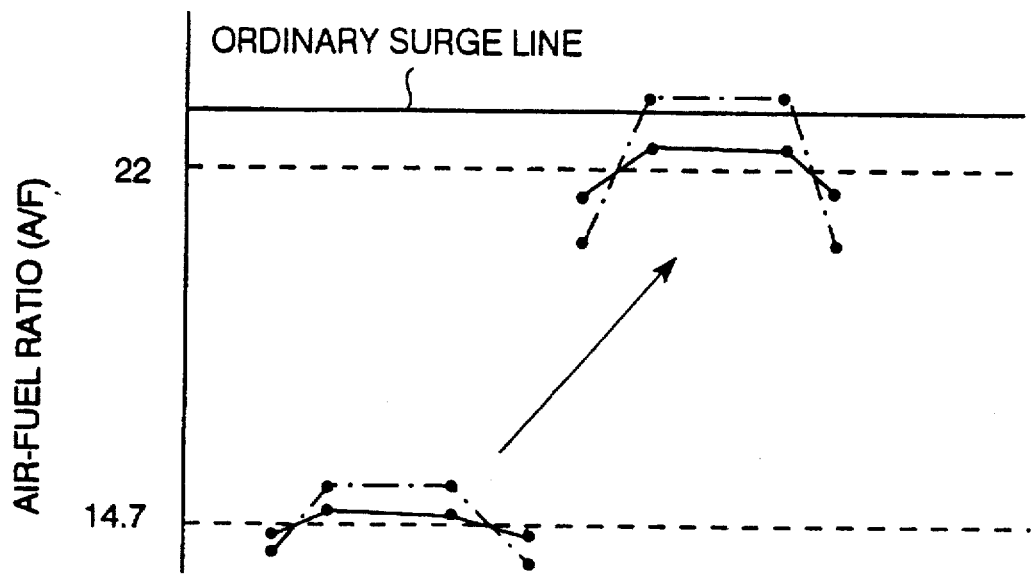
FIG. 18 is a graph of the dispersion of air-fuel ratio among the cylinders

The air and fuel vapor supply system depicted in FIG. 13 supplies fuel vapor, as well as air, to where the respective injectors 40 are disposed through the assist air supply pipe 52, so as thereby to achieve uniform delivery of fuel vapor to the respective cylinders. This results in an effective purge of fuel vapor during lean burning. Specifically describing the effect of the air and fuel vapor supply system in conjunction with FIG. 18 showing dispersion of air-fuel ratio among the cylinders relating to a stoichiometric fuel mixture and a lean fuel mixture (A/F=22), there is a general tendency that the air-fuel ratio disperses caused with regard to a lean fuel mixture more greatly than with regard to a stoichiometric fuel mixture. With a conventional way of supplying fuel vapor to an intake manifold, there occur dispersion of air-fuel ratio among the cylinders as indicated by a double dotted broken line. In particular, the lean fuel mixture causes great dispersion of air-fuel ratio such as exceeding an ordinary surge line. Such dispersion of air fuel ratio leads to a torque change. In contradistinction to this, with the air and fuel vapor supply system, there occurs only small dispersion of air-fuel ratio among the cylinders which does not exceed the ordinary surge line even during lean burning. Consequently, fuel vapor is effectively supplied without causing a significant torque change even during lean burning. Further, the fuel vapor, which is a sort of gasified fuel, is contributory to a creation of a fuel distribution pattern advantageous for a reduction in the amount of a nitrogen oxide emission in the exhaust.

Figure 20:
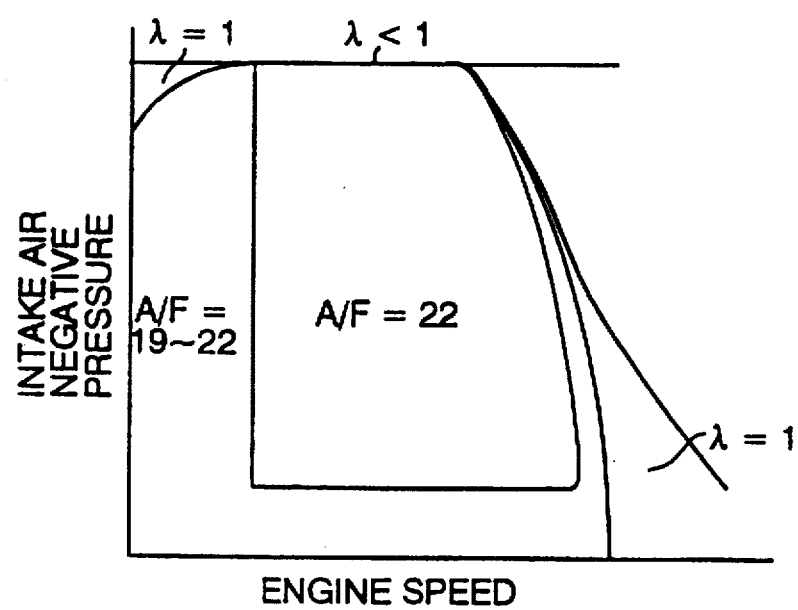
FIG. 20 is a diagram, similar to FIG. 19, showing a control pattern of air-fuel ratio with respect to intake air negative pressure and engine speed.

In the operation of the engine control unit 70 relating to the air-fuel ratio control, various air-fuel ratio zones are predetermined with respect to engine operating conditions, i.e. engine speed and engine load which is defined by throttle valve opening, as shown in FIG. 16 or intake air negative pressure and engine speed as shown in FIG. 20.

When the engine operating condition is in a range of low and moderate engine speeds and an engine load range from a low engine load defined by a low throttle position, excepting an idle position or fully closed position for deceleration, to a high engine load defined by a predetermined large throttle position in close proximity to the full throttle position, the engine control unit 70 creates a fuel mixture leaner ($\lambda>1$) than the stoichiometric fuel mixture ($\lambda=1$). The lean burn range of engine operating conditions where a lean fuel mixture is delivered is specifically defined below an throttle opening of approximately ⅝ with respect to the full throttle position in an engine speed range where the intake system 20 causes an increase in the air charging efficiency. In the major part of the lean burn range of engine operating conditions, the fuel mixture is controlled to be at a predetermined lean ratio (A/F) of, for instance, 22 within the limits that the engine 1 produces nitrogen oxides (NOx) whose proportion in the exhaust is sufficiently small and causes a torque change less than a permissible change. An upper limit of the lean burn range of engine operating conditions where the predetermined highly lean air-fuel ratio is allowed is a point where the amount of intake air reaches a saturation point, i.e. where the amount of intake air can not increase due to development of an intake air negative pressure to a limit as shown in FIG. 20.

Around the major part of the lean burn range where the predetermined highly lean air-fuel ratio is allowed, the air-fuel ratio (A/F) is set within a predetermined specific extent so as to be less than the predetermined lean air-fuel ratio or close to the stoichiometric air-fuel ratio. For instance, the air-fuel ratio is specified between 19 and 22 which have a sufficient surplus with regard to a permissible amount of nitrogen oxides (NOx). This specific extent of air-fuel ratio, which will be described in detail later, assures a nitrogen oxide emission in the exhaust after the catalytic convertor 61 to be less in proportion than a permissible limit. On a higher engine load side of the lean burn range where the predetermined highly lean air-fuel ratio is allowed, the air-fuel ratio is changed gradually smaller within the specific extent with an increase in throttle opening.

In a range of low engine speeds and a certain range of engine loads on a higher side of the lean burn range where the predetermined highly lean air-fuel ratio is allowed or in a range of low engine loads and a certain range of engine speeds on a higher side of the lean burn range where the predetermined highly lean air-fuel ratio is allowed, a fuel mixture is controlled as the stoichiometric fuel mixture ($\lambda=1$). Further, In a range of high engine loads and high engine speeds, a fuel mixture is enriched to be richer ($\lambda<1$) than the stoichiometric fuel mixture ($\lambda=1$). Further, a fuel mixture is controlled as the stoichiometric fuel mixture ($\lambda=1$) in an idle range of engine operating conditions and is, however, suspended from delivery in a range of fully closed position for deceleration.

Figure 19:
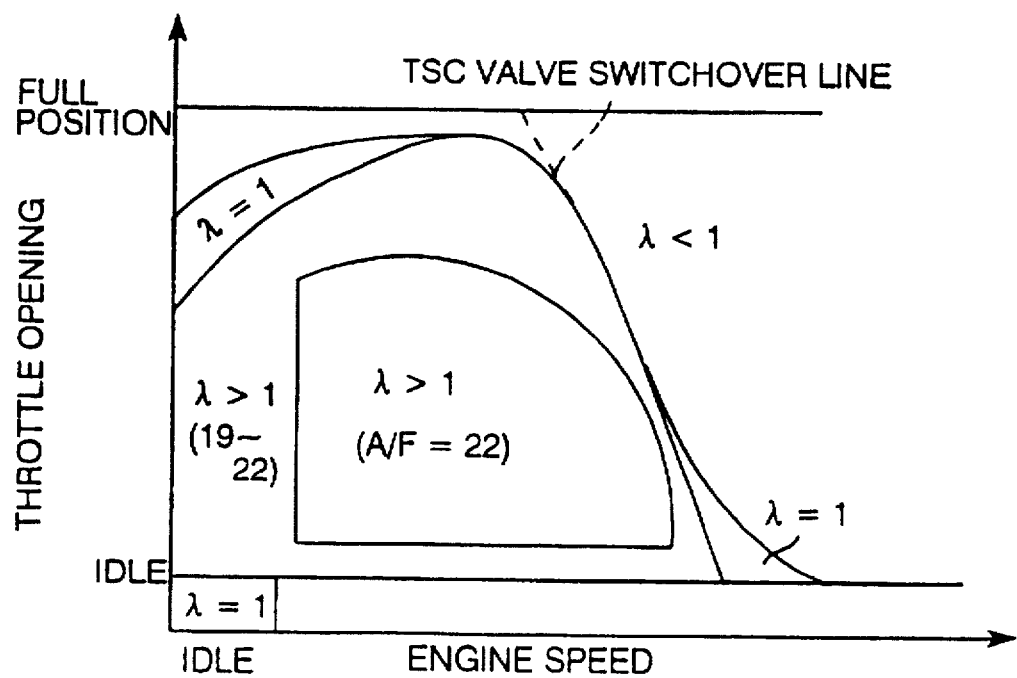
FIG. 19 is a diagram showing a control pattern of air-fuel ratio with respect to throttle opening and engine speed.

According to an output signal from the oxygen ($O_2$) sensor 60, the engine control unit 70 performs a feedback control of air-fuel ratio in the lean burn range or in the stoichiometric range so as to deliver the predetermined air-fuel ratio of fuel mixture in conformity with an engine operating condition defined by the setting pattern shown in FIG. 19 and described above. In this instance, in the lean burn range, the feedback control of air-fuel ratio is performed so as to deliver the predetermined air-fuel ratio of fuel mixture defined by the setting pattern even during transitional engine operation such as acceleration. In other words, the same air-fuel ratio control map is used for both ordinary engine operation and transitional engine operation. When engine operation is changed from the lean burn range to the stoichiometric range or a range of engine operating condition which allows air-fuel ratios richer than the stoichiometric air-fuel ratio, the engine control unit 70 performs a control in which the air-fuel ratio changes gradually with an advancing time.

In the operation of the engine control unit 70 relating to the fuel injection timing control, the injectors 40 are activated so as to perform the sequential timed fuel injection. That is, each of the injectors 40 is activated to inject a fuel at a specific timing on an intake stroke so that, while forming approximately uniform distribution of a fuel in a related combustion chamber 2, a concentration of the fuel mixture is controlled thicker a little locally around a related spark plug 12 than around the remaining part in the combustion chamber 2. In order to prevent an increase in the amount of nitrogen oxide emission due to a thickened concentration of the fuel mixture in excess, in particular, around the spark plug 12, the degree of stratification of the fuel mixture is controlled, and the fuel injection is timed in a period of time within an angle of 60° after top dead center (TDC) on an intake stroke. In this instance, if it is expected that fuel injection is incompletely performed in the period, what is called divided injection in which an incomplete part of fuel injection is made in advance before the intake stroke may be performed. In the divided fuel injection, if the demanded amount of fuel, which is estimated in a specified period before an intake stroke, is greater than the maximum limit of fuel injection during an intake stroke, an infeasible part of fuel injection is made in advance before the intake stroke. Thereafter, another demanded amount of fuel is operated at the beginning of fuel injection in the intake stroke. If in fact the advance fuel injection has been made before the intake stroke, injection of the difference between the other demanded amount of fuel and the amount of fuel having delivered in the advance fuel injection is made in the intake stroke.

As having been proved that an air-fuel ratio control by means of fuel injection causes certain control errors due to a responsiveness of the thermal type of air flow sensor 32, a delay in flow of intake air into the combustion chambers 2 after measurement, and a delay in delivery of a fuel into the combustion chambers 2. In order to make precise fuel injection, correction values with regard to these errors are obtained based on a theoretical dynamic model of transient phenomena of intake air and fuel. These corrections includes a correction of a delay in thermal response of the air flow sensor 32, a correction of a delay in charging intake air into the combustion chamber 2 due to the capacity of the intake pipe 30, a correction of a change in the charging amount of intake air occurring between a time the operation of the charging air amount and closing of the intake valves 7 and 8, and a correction of a change in the amount of a fuel due to adhesion of the fuel to the wall of the intake pipe 30.

The tumble/swirl control (TSC) valves 41 are controlled to open and close the secondary intake ports 4 with respect to the limit line on the higher speed side of the lean burn range as a boundary line. Specifically, the tumble/swirl control (TSC) valves 41 open the secondary intake ports 4 at engine speeds on the higher side of the lean burn range and close them at engine speeds on the lower side of the lean burn range.

Figure 21:
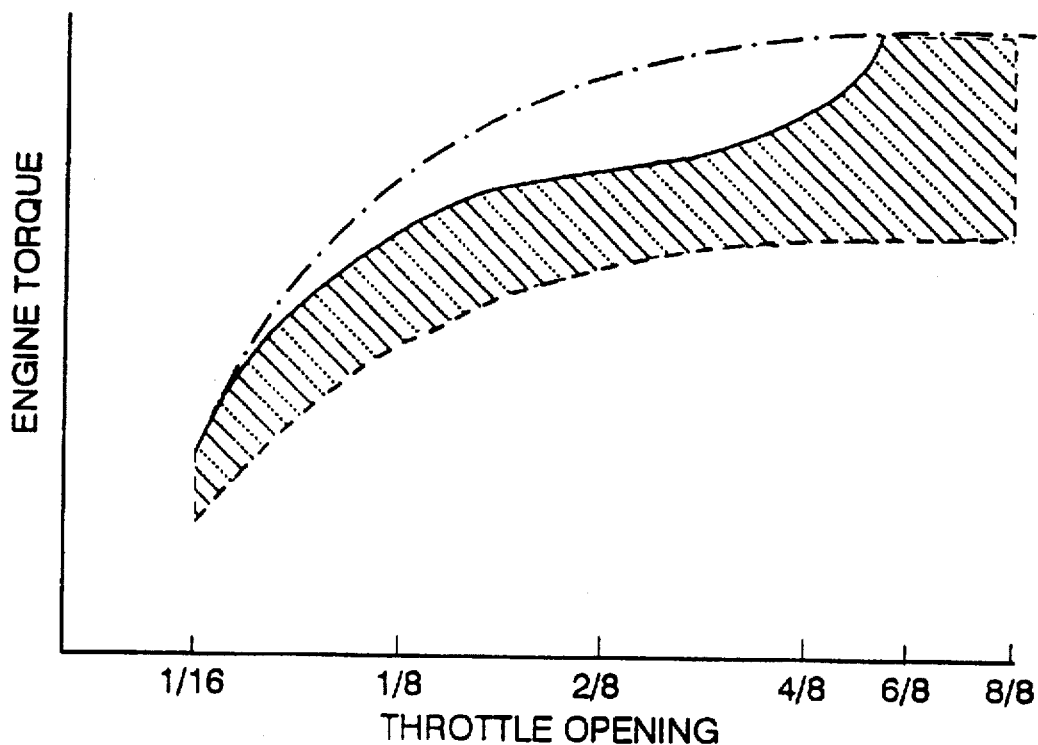
FIG. 21 is a diagram showing a change in engine output torque with respect to throttle opening.

In the lean burn range of engine operating conditions, the idle speed control (ISC) valve 37 is controlled to open the air pipe 35 so as to increase the amount of intake air, thereby causing the engine to yield an increase in output torque during lean burning. As compared with the case where lean burning is made without such an increase in the amount of intake air in the lean burn range where the predetermined highly lean air-fuel ratio is allowed, the engine output torque is raised from a level shown by a broken line to a level shown by a solid line in FIG. 21. In the range of engine operating conditions where the amount of intake air reaches the saturation point, while causing the idle speed control (ISC) valve 37 to open the air pipe 35 does not yield an increase in the amount of intake air, nevertheless, the engine output is raised by controlling the air-fuel ratio to become gradually small and the timing of ignition as was previously described. In FIG. 21, the engine output torque produced when a stoichiometric fuel mixture is burned over the entire range of engine operating conditions is indicated by a dotted broken line.

Figure 22:
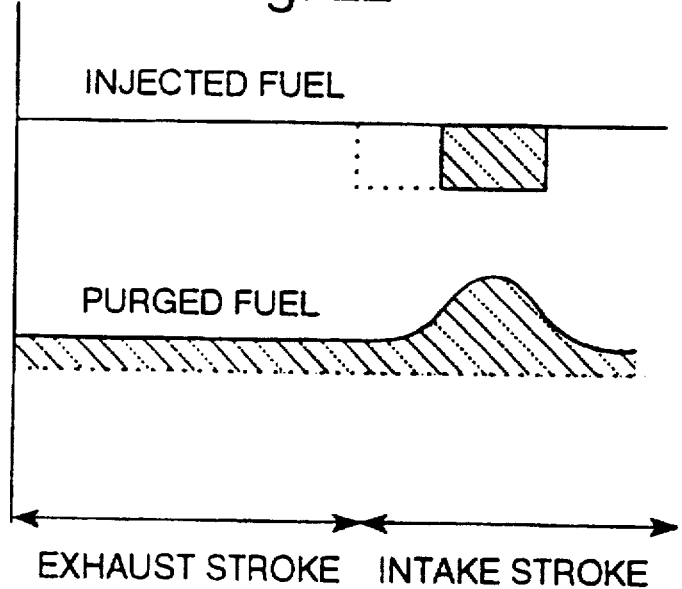
FIG. 22 is a timing chart of fuel injection and fuel vapor supply.

As was previously described, the air control valve 51 opens the air supply pipe 52 to allow air to be supplied to the injectors 40 in the range of low engine speeds where lean burning is made. Further, the purge valve 58 is driven so as to control a desired amount of fuel vapor according to engine operating conditions. If fuel vapor is purged during the feedback control of air-fuel ratio in the sequential timed fuel injection, the amount of fuel delivered through the injector 40 is reduced according to the amount of purged fuel vapor. While the fuel vapor purging reduces the amount of fuel delivered in an intake stroke, it does not have an adverse effect to the stratification of a fuel mixture in the combustion chamber 2. This is because the fuel vapor in the air supply pipe 52 is sucked as well as assist air by means of the negative pressure caused in an intake stroke and introduced into the combustion chamber 2 almost the same timing as fuel injection in the intake stroke as shown in FIG. 22, so as to compensate the reduced amount of fuel.

Since, during lean burning, a fuel mixture tends to be sparse, there is a demand for improved ignitability. In order for the lean burn engine 1 to create high ignitability and reliable ignition, a high energy type of ignition system is employed. Specifically, the ignition system, which includes an ignition coil having characteristics changed so as to produce electric energy for ignition increased as compared with ordinary ignition coils and a low resistance type of high tension wire which is capable of reducing transmission loss, has an electric discharge time 1.5 times as long as that of ordinary ignition systems. Further, the ignition system uses a platinum spark plug which is proof against high electric energy.

With the lean burn engine 1, the limit of air-fuel ratio for lean burning or for a permissible change in engine output torque is raised. That is, in a condition where the tumble/swirl control (TSC) valves 41 is closed, an inclined swirl of a fuel mixture is produced in the combustion chamber 2 as shown in FIG. 3, so as to enhance uniform distribution of the fuel mixture and accelerate combustion of the fuel mixture. Consequently, even a lean fuel mixture burns efficiently. In addition, since the air mixing type injector (AMI) 40 produces fine fuel particles, the lean fuel mixture burns more efficiently. The lean fuel mixture is desirably stratified by means of the sequential timed fuel injection, so as to burn in good order. Further, the high energy type of ignition system ignites the lean fuel mixture reliably.

Figure 23:
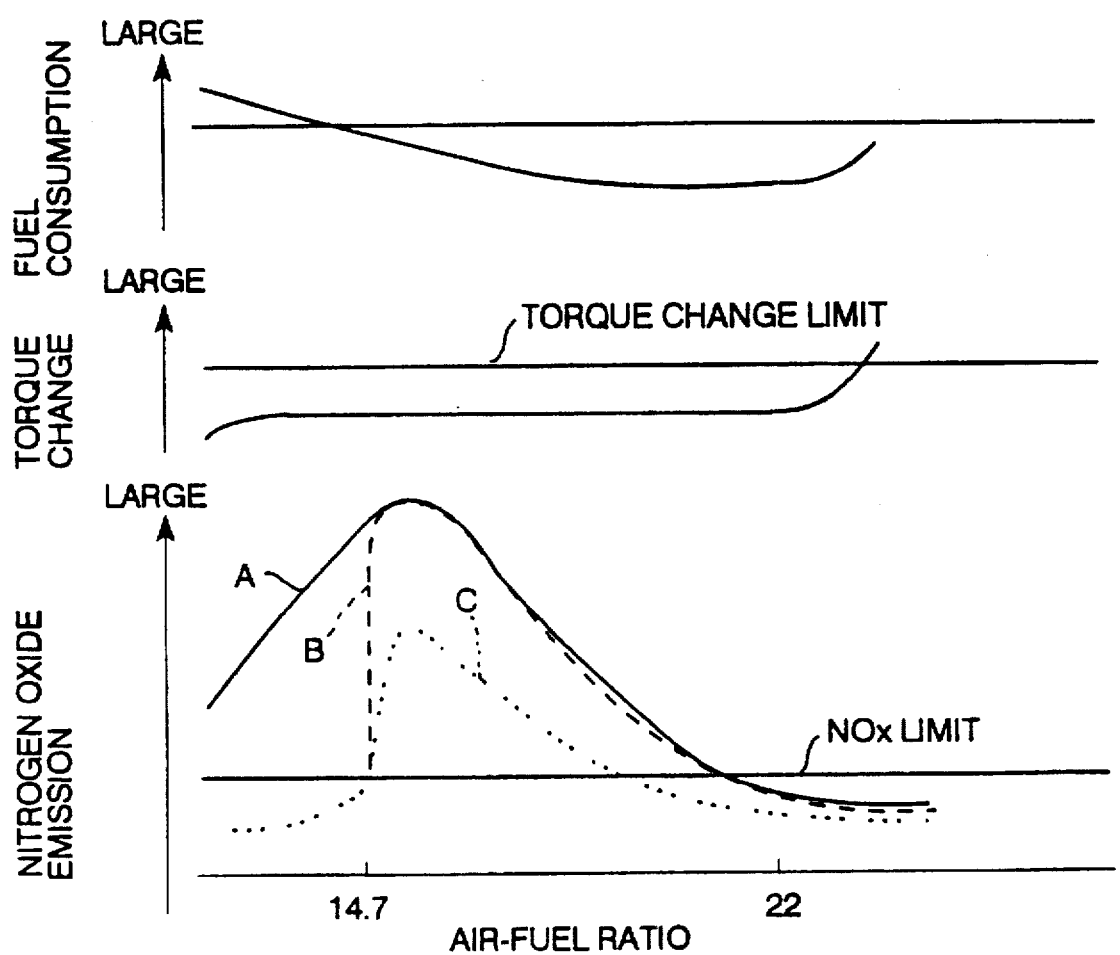
FIG. 23 is a diagram showing the characteristics of the lean burn engine.

As shown in FIG. 23, owing to various effects described above, the limit of lean air fuel ratio is raised above 25. With respect to fuel consumption and an emission of nitrogen oxides (NOx), it is proved that the air-fuel ratio is desirable to be between approximately 19 and the limit of lean air-fuel ratio. Consequently, it is concluded that an air-fuel ratio of approximately 22 is most desirable with respect to fuel consumption and an emission of nitrogen oxides (NOx) and has a certain surplus with regard to the limit of lean air-fuel ratio while making a lean fuel mixture burn in good order. The lean burn engine 1 causes improved alleviation of a nitrogen oxide (NOx) emission in the exhaust. As clearly seen in FIG. 23 showing the amount of nitrogen oxide (NOx) emission in the exhaust before a catalytic convertor by a solid line A, after a conventional catalytic convertor rhodium by a broken line B, and after the reducing type of catalytic convertor 61 by a dotted line C, the lean burn engine 1 of the present invention has a significant effect of reducing a nitrogen oxide (NOx) emission during lean burning. In addition, the production of fine fuel particles, which is realized with the assistance of the intake ports 3 and 4 structured as shown in FIGS. 2–4, the uniform distribution of a fuel mixture, and the use of the air mixing type injector (AMI) 40, is contributory to alleviation of the amount of a nitrogen oxide (NOx) emission in the exhaust. As verified above, the lean burn engine 1 burns a lean fuel mixture at an air-fuel ratio of approximately 19, which exceeds the limit of air-fuel ratio for the permissible amount of a nitrogen oxide (NOx) emission for the prior art lean burn engine, with a sufficiently alleviated emission of nitrogen oxides (NOx).

Figure 24:
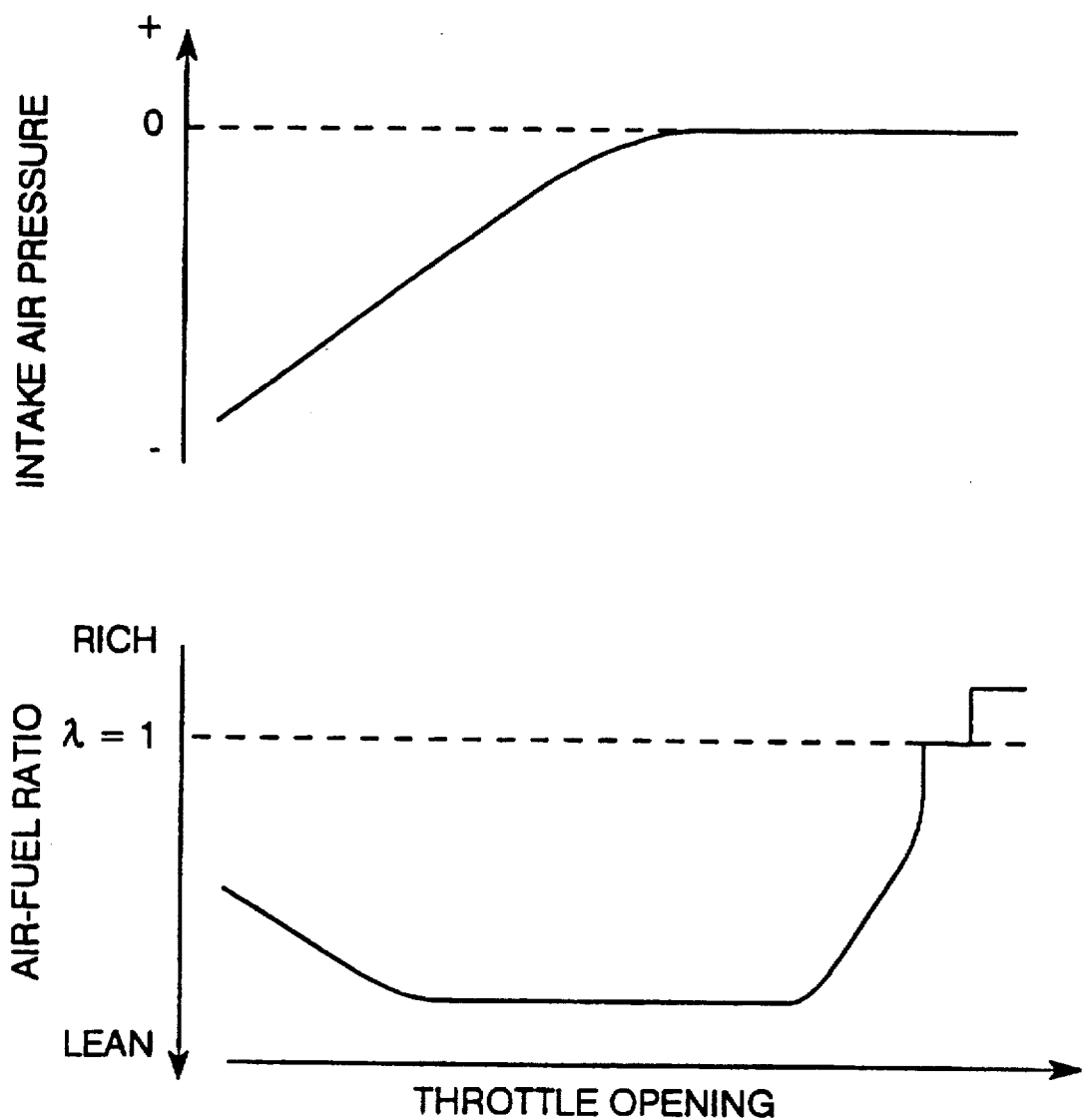
FIG. 24 is a diagram showing the relation of intake air pressure and air-fuel with respect to throttle opening.

The lean burn engine 1 increases the air charging efficiency due to the dynamic effect of intake air in the range of low engine speeds where the tumble/swirl control (TSC) valves 41 is closed, providing necessary output torque even in the range of low engine speeds where lean burning is made. Further, due to the closing timing of the intake valves adapted to meet a demand for an increase in air charging efficiency in the range of low engine speeds and the reduced flow coefficient of intake air through the primary intake port 3, the engine output torque is increased in the range of low engine speeds where lean burning is made. Consequently, the lean burn engine 1 produces demanded output torque in a range of engine operating conditions widened toward higher engine loads even if burning a lean fuel mixture even at an air-fuel ratio of approximately 22 which is highly lean. When the lean burn engine 1 operates with a load as high as providing a limited increase in engine output torque at that air-fuel ratio, the air-fuel ratio is gradually reduced from 22 toward 19. That is, as shown in FIG. 24, in addition to an increase in air charging efficiency, the fuel mixture retains its leanest condition until the throttle valve 33 reaches a critical opening approximately as large as the pressure of intake air reaches the limit and the lean burning continues with a change in the air-fuel ratio within an extent in which a nitrogen oxide (NOx) emission is alleviated below the permissible limit of amount by the reducing type of catalytic convertor 61 until the throttle valve 33 opens larger than the critical opening. In this way, as compared with the prior art lean burn engine, the lean burn engine 1 expands its lean burning range greatly with retaining the effect of alleviating an emission of nitrogen oxides (NOx).

Because the same air-fuel ratio control map is used for both ordinary engine operation and transitional engine operation, in the lean burning range of engine operating conditions, there are realized efficient fuel consumption and well controlled emissions even during transient engine operation, such as acceleration, due to lean burning. In such transient engine operation, since the air charging efficiency is raised, the lean burn engine 1 produces reliable engine output torque necessary for acceleration and keeps the desired combustibility of a lean fuel mixture due to the precise control of fuel injection.

Since, in addition to prevention of a change in air-fuel ratio of the fuel mixture by means of the precise control of fuel injection, the stability of fuel combustion is improved due to an inclined swirl of a fuel mixture and atomization of the fuel mixture by the air mixing type injector (AMI) 40, the lean burn engine 1 has an effect of alleviating a change in output torque. Furthermore, since the lean burn engine 1 is supplied with fuel vapor even in the lean burn range of engine operating conditions, it yields a reduction of practical fuel consumption. That is, since the prior art lean burn engine is not supplied with fuel vapor in a lean burn range of engine operating condition, excessive fuel vapor in the canister is discharged into atmosphere, so that the prior art lean burn engine suffers an increase of practical fuel consumption, in particular, if a large amount of fuel vapor is produced resulting from lean burning made in a wide range of engine operating conditions. In contradistinction to the prior art lean burn engine, the lean burn engine 1 of the present invention makes utilization of fuel vapor even in the lean burning range of engine operating conditions, reducing accumulation of fuel vapor in the canister and, consequently, discharge of the fuel vapor into atmosphere. In this instance, because fuel vapor is delivered to the air mixing type injector (AMI) 40, the fuel vapor supply during lean burning does not cause a change in the engine output torque and harm the stratification of a fuel mixture.

Figure 25:
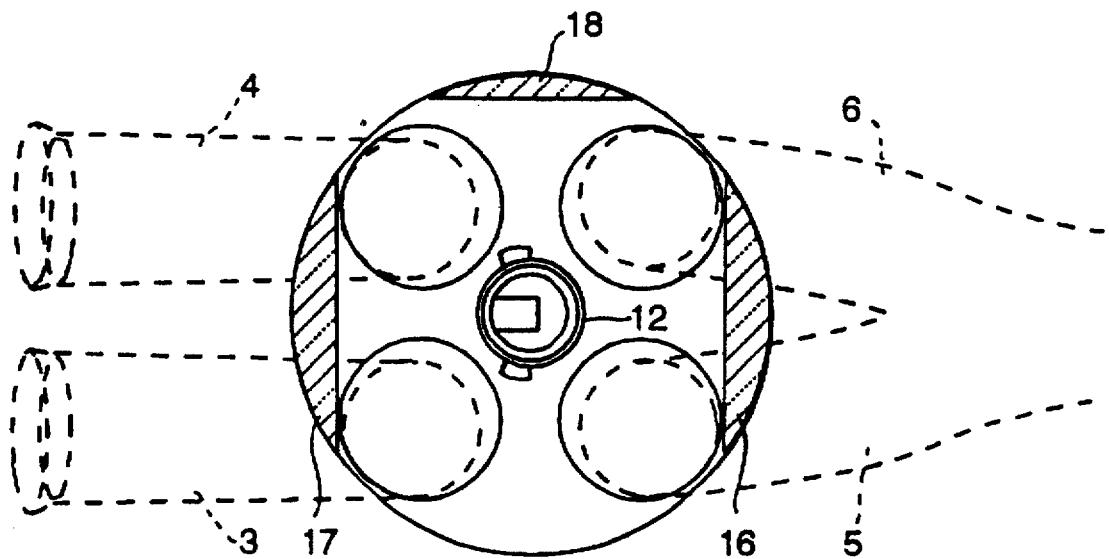
FIG. 25 is a bottom view of a cylinder head.
Figure 27:
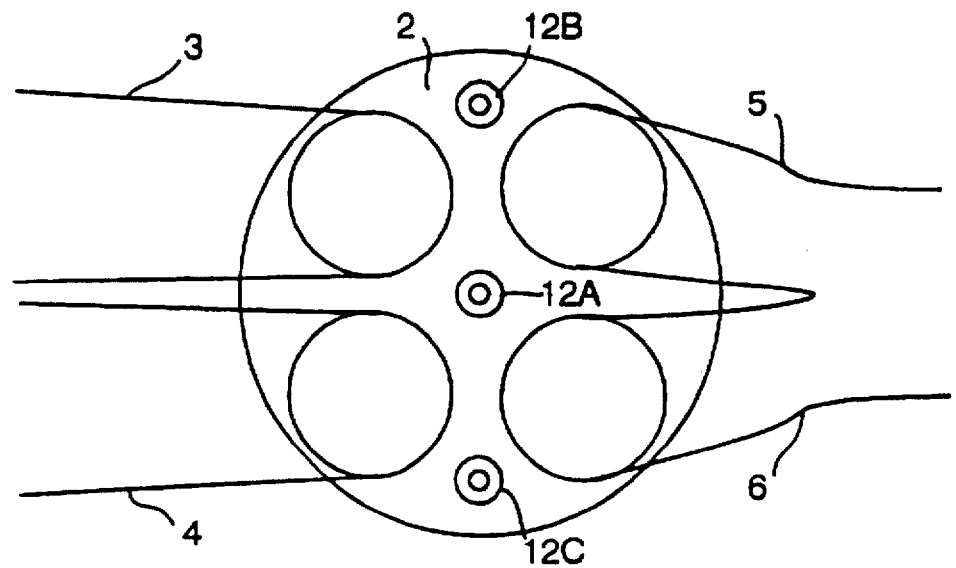
FIG. 27 a schematic plan view of a combustion chamber of a lean burn engine in accordance with still another preferred embodiment.
Figure 26:
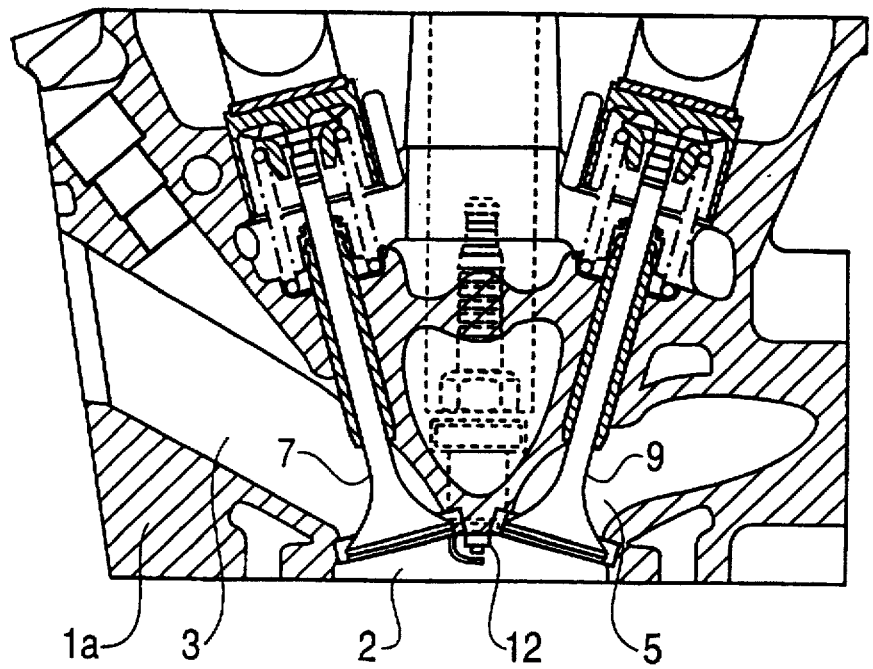
FIG. 26 is a schematic plan view of a combustion chamber of a lean burn engine in accordance with another preferred embodiment.

Referring to FIGS. 25–27, in conjunction with FIG. 1, showing an engine according to another embodiment of the present invention, the engine has intake and exhaust valves opened and shut at a predetermined timing and is provided with an expeditious combustion system which assists a fuel mixture to burn expeditiously so as to shorten the period of fuel combustion in a range of low engine speeds. In this instance, the engine employs a slow and invariable closing timing type of intake valves contributory to increasing air charging efficiency in the range of low engine speeds and a fast speed and invariable timing type of exhaust valves contributory to discharging a burned gas expeditiously.

The expeditious combustion system comprises a means for magnifying the strength of turbulence of a fuel mixture caused by air introduced into a combustion chamber and a means for shortening the distance of flame propagation and is realized by, for instance, the structure of the engine shown in FIGS. 2–4. FIGS. 25 and 26 show more detailed structure of the engine as the expeditious combustion system. The engine 1 is formed with two intake ports for each cylinder, namely a primary intake port 3 configured to produce a turbulence flow of a fuel mixture and a secondary port 4 which is closed in a range of low engine speeds. These intake ports 3 and 4 are configured so as to form a part of the expeditious combustion system. The combustion chamber 2 is configured to be compact so as to shorten the distance of flame propagation, thereby realizing expeditious combustion of a fuel mixture. In the secondary port 4, or otherwise in an individual intake passage 23s (see FIG. 11) upstream from the secondary port 4, there is provided a tumble/swirl control (TSC) valve (not shown) which opens and shuts according to engine operating conditions. The intake ports 3 and 4, the intake and exhaust valves 7–10, and the combustion chamber 2, which are configured and arranged in relative positions as described relating to the previous embodiment, form the expeditious combustion system in cooperation with these elements and structures, and produce a slanting swirl in the form of a complex turbulence consisting of a tumble and a swirl in the combustion chamber 2.

The cylinder 2 has a bore diameter relatively small as compared with a piston stroke and is configured to be of what is called a pent roof lens type. Further, the combustion chamber 2 is formed with squash areas 16–18 around the exit opening of the primary intake port 3 so as to shorten the distance of flame propagation from a spark plug 12 at the center of the combustion chamber 2 to the periphery of the combustion chamber 2 as short as possible. The intake valves 7 and 8 and the exhaust valves 9 and 10 open and shut at valve timing shown by the diagram in FIG. 8.

With the engine 1 thus structured, the slow speed type of intake valves 7 and 8, which close at a relatively early time, prevent a back-blow of intake air in a range of low engine speeds, increasing the air charging efficiency and boosting engine output torque in the range of low engine speeds. On the other hand, while the exhaust valves 9 and 10 are of the fast speed type which open at a relatively early time, they retains the effect of boosting of engine output torque in the range of low engine speeds with the assistance of the expeditious combustion system. This is because, the structure of enhancing the strength of turbulence as shown in FIGS. 2–4, 25 and 26 produces an inclined swirl in the range of slow engine speeds where the tumble/swirl control valve 41 closes, combustion of a fuel mixture is accelerated and, simultaneously, the compact combustion chamber 2 shortens the distance of flame propagation, shortening the period of combustion. As a result, even though the exhaust valves 9 and 10 open at an early time, the energy of combustion is imparted sufficiently to the piston before the exhaust valves 9 and 10 open and, consequently, there does not occur discharge of the energy of combustion more into the exhaust ports 5 and 6, so that the boost of engine output torque is not arrested even in the range of low engine speeds. Furthermore, because exhausting a burned gas is expedited in the range of high engine speeds and, consequently, a pumping loss is reduced during exhausting, the fast speed type of exhaust valves make up a drop in engine output torque in the range of high engine speeds.

For the expeditious combustion system, the engine 1 may be provided with either only one of the means for enhancing the strength of turbulence including the primary intake port 3 configured to produce a turbulence flow of a fuel mixture and the secondary port 4 which is closed in a range of low engine speeds and the means for shortening the distance of flame propagation. Further, in place of configuring the combustion chamber 2 to be compact, it may be done to install a plurality of spark plugs 12A–12C in each combustion chamber as shown in FIG. 27 so as to establish short distances of flame propagation from the respective spark plugs, thereby accelerating the combustion of a fuel mixture.

The lean burn engine may be provided with an assist air supply system for supplying air so as to expedite fuel combustion while the engine is cold.

Conventionally, it has been established a theory that an assist air supply system is practical in order only to expedite fuel combustion and reduce emissions such as hydrocarbons (HC) and carbon monoxide (CO) produced due to the expedited fuel combustion and that expeditious fuel combustion increases a nitrogen oxide emission. Accordingly, it has never been considered to provide lean burn engines with assist air supply systems in order to reduce a nitrogen oxide emission. However, as was previously described, it was found that while an lean burn engine provided with an assist air supply system is enabled to expedite atomization of a fuel mixture and improve combustibility of even a lean fuel mixture, nevertheless, the lean burn engine reduces a nitrogen oxide emission. Based on the fact, the lean burn engine 1 is provided with an assist air supply system structured as shown in FIG. 13 in association with an air mixing type injector (AMI) 40 shown in FIGS. 14 and 15.

In the control of fuel injection timing and assist air supply, a fuel mixture is controlled to be leaner ($\lambda>1$) than a stoichiometric fuel mixture ($\lambda=1$) in a specific range of engine operating condition. For instance, such a lean range of engine operating conditions is established as shown in FIG. 19. Otherwise, the air-fuel ratio may be controlled to be constant over the lean range of engine operating conditions. In the fuel injection timing control, the injectors 40 are activated at a specified timing on an intake stroke so as to perform the sequential timed fuel injection, thereby, on one hand, forming approximately uniform distribution of a fuel in the combustion chamber 2 and, on the other hand, providing fuel concentration thicker a little locally around a spark plug 12 than around the remaining part in the combustion chamber 2. In order to prevent an increase in the amount of nitrogen oxide emission due to a thickened concentration of the fuel mixture in excess around, in particular, the spark plug 12, the degree of stratification of the fuel mixture is controlled, and the fuel injection is timed in a period of time within an angle of 60° after top dead center (TDC) on an intake stroke.

In the assist air supply control, the air control valve 51 is opened to supply assist air in a range enclosed in the lean range of engine operating condition. For instance, the air control valve 51 is opened during idling or in a range of high engine loads and, otherwise, closed.

With the lean burn engine, in addition to the improvement of fuel consumption efficiency in the specified range of engine operating conditions where lean burning is made, uniform distribution of a fuel mixture is realized due to atomization of the fuel with the assistance of mixing air, providing improvement of fuel combustibility. In particular, since mixing air is supplied to the injector 40 even in the lean range of engine operating condition, the lean burn engine has an effect of reducing an emission of nitrogen oxides (NOx) during lean burning as shown in FIG. 28.

Figure 28:
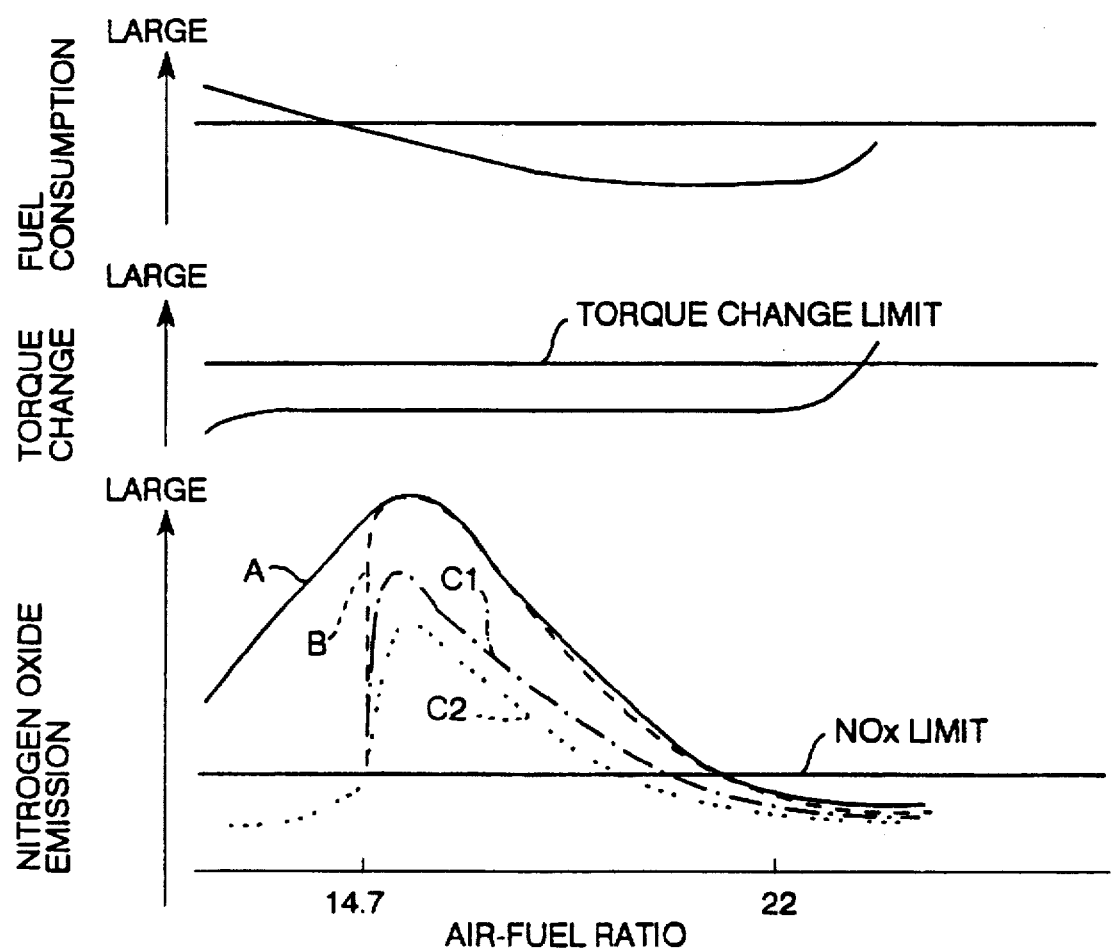
FIG. 28 is a diagram showing the characteristics of the lean burn engine.

FIG. 28 shows an experimental result of lean burning with respect to proportions of a nitrogen oxide emission in the exhaust before a catalytic convertor in the instance A where mixing air is not supplied to an injector, after a conventional catalytic convertor rhodium in the instance B where mixing air is not supplied to an injector, after a conventional catalytic convertor rhodium in the instance C1 where mixing air is supplied to an injector, and after a reducing catalytic convertor in the instance C2 where mixing air is supplied to an injector. As clearly understood from FIG. 28, the lean burn engine 1 of the present invention has a significant effect of reducing a nitrogen oxide (NOx) emission during lean burning when mixing air is supplied. The reason for this effect is clear from the description given in conjunction with FIGS. 17 and 18.

In addition, because the fuel injection is made during an intake stroke, a fuel mixture is stratified so as to create the concentration of a fuel mixture thicker a little locally around, in particular, the spark plug 12 than around the remaining part in the combustion chamber 2. This assures high ignitability during lean burning and enables the lean burn engine to use a leaner fuel mixture. In particular, when the air-fuel ratio of a fuel mixture is determined to be close to the lean burn limit and the timing of injection for the injectors 40 is determined so as to create an air-fuel ratio approximately 10% greater locally around the spark plug 12 as compared with the entire area of combustion chamber 2, the lean burn engine 1 causes a change in thermal efficiency and a reduction in the amount of nitrogen oxide emission as shown in FIG. 29.

Figure 29:
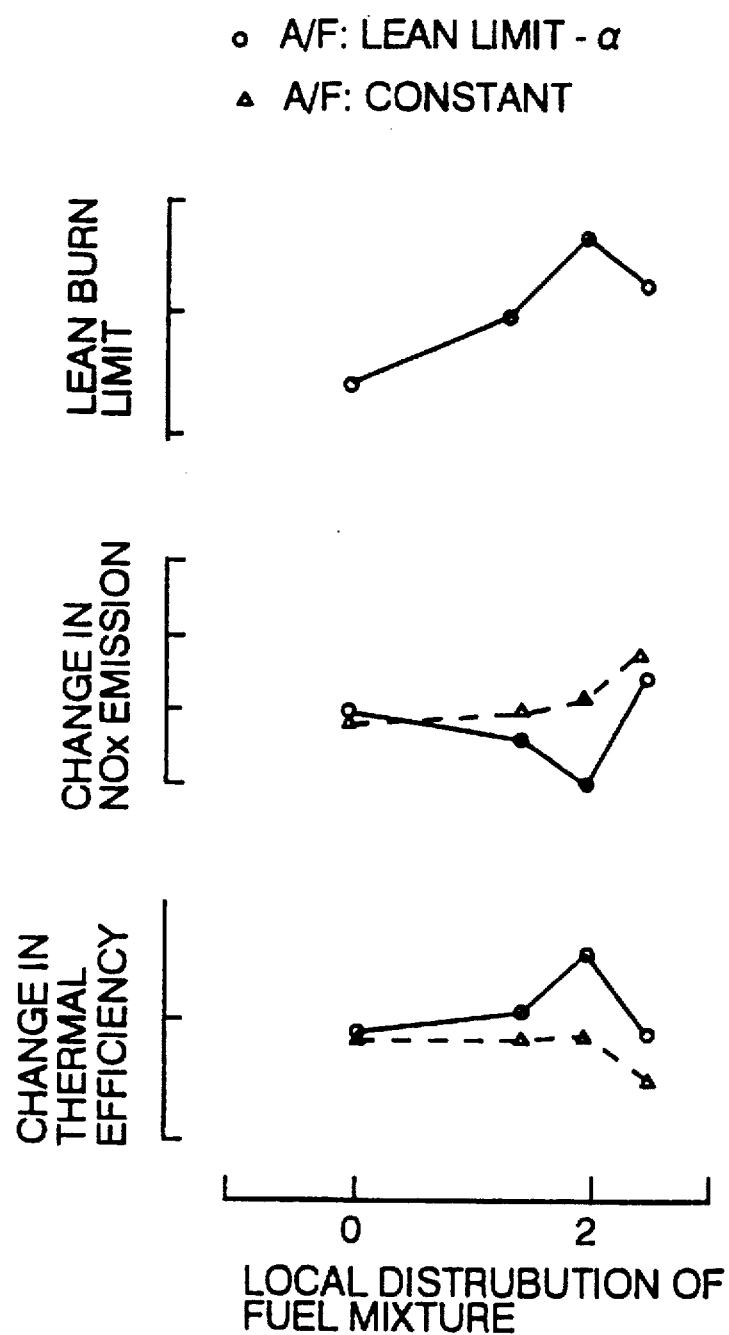
FIG. 29 is a diagram showing the characteristics of the lean burn engine with respect to fuel distribution patterns.

FIG. 29 shows an experimental result of lean burning of different local distribution of fuel mixtures which are created by changing fuel injection timing with respect to a lean burn limit, a reduction in nitrogen oxide emission in the exhaust, and a change in thermal efficiency. In this instance, the term "local distribution" shall mean and refer to the difference between an air-fuel ratio in the entire area of combustion chamber and an air fuel ratio around a spark plug. In FIG. 29, the reduction in nitrogen oxide emission in the exhaust and a change in thermal efficiency are shown with regard to a specific air-fuel ratio in the entire area of combustion chamber of, for instance, approximately 22 and an air-fuel ratio in the entire area of combustion chamber less than the lean burn limit by a surplus of $\alpha$. As apparent from the figure, the lean burn limit is greatly elevated when a fuel mixture is stratified so as to have the degree of local distribution of 2 than when it is not stratified (the degree of local distribution is 0). If the fuel mixture is stratified to a greater degree, it experiences to aggravation of the stability of combustion due to ununiform distribution. This results in an increase in the amount of an nitrogen oxide emission and aggravation of thermal efficiency due to an increase in temperature caused locally in the combustion chamber as well as in diminishing the lean burn limit of air-fuel ratio. In contradistinction to this, when a fuel mixture is stratified so as to create a degree of local distribution of 2, which, as was previously described, creates an air-fuel ratio approximately 10% greater locally around the spark plug 12 as compared with the entire area of combustion chamber 2, and is adjust so that the air-fuel ratio is close to the lean burn limit, i.e. less than the lean burn limit by a surplus of α, the lean burn engine 1 yields a great reduction in the amount of an nitrogen oxide emission and improvement of thermal efficiency due to a proper degree of stratification and expedited fuel atomization. In this instance, such stratification of a fuel mixture which creates a degree of local distribution of 2 is obtained by terminating fuel injection through the given injector at a timing approximately 60° after TDA on an intake stroke.

The lean burn engine may be adapted to supply fuel vapor even in a lean range of engine operating conditions where a specified, highly lean air-fuel ratio close to a lean burn limit is established so as to elevate the lean burn limit of air-fuel ratio while improving practical fuel consumption efficiency and providing the reliable stability of combustion during lean burning even when using fuel vapor. The lean burn engine thus adapted is configured as shown in FIGS. 2-4 so as to produce a swirl in the combustion chamber 2 by mean of the primary intake port 3 when the secondary intake port 4 is closed by the tumble/swirl control valve 41. The lean burn engine 1 is provided with an assist air and fuel vapor supply system structured as shown in FIG. 13 in association with an air mixing type injector (AMI) 40 shown in FIGS. 14 and 15. Fuel vapor is supplied to the air supply pipe 52 and then into the annular space 402 formed by the cylindrical partition 401 surrounding the nozzle of each injector 40. The orifice 405 in the air nozzle 404 is formed so as essentially to increase a flowing rate of mixing air, thereby expediting atomization of a fuel and, on the other hand, located at the downstream end of each individual intake passage 23s so as to shut out pulsations of intake air.

In the air-fuel ratio control of the lean burn engine 1, a fuel mixture is controlled to have a specified lean air-fuel ratio close to a lean burn limit in a specified lean range of engine operating conditions such as shown, for instance, in FIG. 19. The control of fuel injection is performed by means of the sequential timed fuel injection. The tumble/swirl control valve 41 is controlled to produce a desired swirl in the specified lean range of engine operating conditions as shown in FIG. 19.

The fuel vapor supply system is activated to supply fuel vapor at least in the specified lean range of engine operating conditions. For instance, the fuel vapor supply system is activated when a predetermined purge condition is satisfied in a range of engine operating conditions including therein a range where a stoichiometric air-fuel ratio is created as well as in the specified lean range of engine operating conditions. In other words, as was previously described, the purge valve 58 is driven so as to supply a desired amount of fuel vapor according to engine operating conditions when the predetermined purge condition is satisfied.

With the lean burn engine 1 described above, because fuel vapor is supplied even in the specified lean range where the specified lean air-fuel ratio close to the lean limit is established, discharge of the fuel vapor into atmosphere is reduced, so as to improve fuel consumption efficiency. Furthermore, because fuel vapor is supplied through the air supply pipe 52 into the annular space 402 formed by the cylindrical partition 401 surrounding the nozzle of each injector 40, the vapor fuel is effectively utilized without occurring a change in engine output torque even during lean burning, as apparently understood from FIG. 18. In addition, because the lean burn engine 1 introduces fuel vapor in an intake stroke, achieving stratification of a fuel mixture effectively. That is, because the supply of fuel vapor is well timed to the injection of fuel through the injector in an intake stroke and the intake ports 3 and 4 produces a desired swirl of fuel mixture, the stratification of the fuel mixture is conserved. Furthermore, the fuel vapor supply system is made compact in structure due to the utilization of the air supply pipe 52 for supplying fuel vapor, as well as air, to the injector 40 and enables it to dilute fuel vapor with air, so as to prevent fuel vapor from being supplied in excess to the combustion chamber 2. It is also achieved by the fuel vapor supply system to make easy control of the amount of fuel vapor, in particular, when there is a demanded for a less amount of fuel vapor. The structure of the fuel vapor supply system in which the fuel vapor purge pipe 57 is connected to the mixing chamber 55 provided at the middle of the air supply pipe 52 has an effect of mixing fuel vapor and air uniformly, creating uniform distribution of the fuel vapor in the combustion chamber. The fuel vapor supply system thus structured has an effect of absorbing, by means of the mixing chamber 55, pulsations caused by the purge valve 58 which is activated by a duty solenoid, so as also to improve uniform distribution of the fuel vapor in the combustion chamber and yield well controlled distribution of the fuel vapor.

The structure of the respective air mixing type injectors (AMI) 40 which are provided with the orifices 405, each of which is provided in a position where air and fuel vapor are delivered, prevents fuel vapor from interference among the combustion chambers 2 and, consequently, from aggravation of uniform distribution. That is, if pressure waves are propagated over through the respective individual intake passages 23s and the air supply pipe 52 through which fuel vapor is supplied as well as air, interference of fuel vapor occurs among the combustion chambers 2 which tends to cause aggravation of fuel distribution. However, the orifice 405 alleviates the propagation of pressure waves, prevents such aggravation of fuel distribution.

Although the fuel vapor supply system is configured in association with the air supply pipe 52 of the air supply system so as to supply fuel vapor to the air mixing type injectors (AMI) 40, it may be provided separately from the air mixing type injectors (AMI) 40. In such a structure, the fuel vapor purge pipe 57 is branched off at its end portion to individual purge pipes through which the fuel vapor purge pipe 57 is connected to the individual intake passages 23s, respectively. It is desired in such a case to provide a chamber in the fuel vapor purge pipe 57 downstream the purge valve 58 so as to absorb pulsations caused by the purge valve 58 and form an orifice in each branched individual purge pipe so as to prevent interference of fuel vapor from occurring among the combustion chambers 2 which leads to aggravation of fuel distribution.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lean burn engine for an automobile which establishes a specified air-fuel ratio, in a lean burn range of low engine speeds and low engine loads, leaner by a predetermined rate than a stoichiometric air-fuel ratio so as to produce a nitrogen oxide emission with a proportion in the exhaust sufficiently less than a predetermined level and causes a change in output torque less than a permissible level and, in a range of high engine loads, an air-fuel ratio equal to or richer than said stoichiometric air-fuel ratio, said lean burn engine comprising:

an air intake system of a low speed type which causes an increase in charging efficiency in a range of low engine speeds; and an exhaust system capable of eliminating the nitrogen oxide emission in the exhaust produced during lean burning at air-fuel ratios leaner than said stoichiometric air-fuel ratio;

said lean burn engine further establishing an air-fuel ratio leaner in a specified range of engine operating conditions in which engine loads are higher than those in a range of low engine loads in which a specified air-fuel ratio is established and to become gradually small within a specified extent with an increase in engine load at a side of higher engine loads in said specified range of engine operating conditions.

2. A lean burn engine as defined in claim 1, wherein a fuel mixture is controlled at a lean air-fuel ratio in said specified range of engine operating conditions during transitional engine operation in addition to during ordinary engine operation.

3. A lean burn engine as defined in, claim 2, and further comprising a plurality of fuel injectors provided one for each cylinder and fuel injection control means for controlling said fuel injectors to inject fuel at a specified timing on an intake stroke.

4. A lean burn engine as defined in claim 1, wherein a fuel mixture is controlled at said specified air-fuel ratio before an engine load increases to a level at which no increase in an amount of intake air occurs in said specified range of engine operating conditions and fuel in said fuel mixture is increased in amount within a specified extent with an increase in opening of an engine throttle valve on a side of higher engine loads than said level.

5. A lean burn engine as defined in claim 1, wherein said specified range of engine operating conditions is defined by openings of said engine throttle valve less than ⅝ of a full opening.

6. A lean burn engine as defined in claim 1, wherein said air intake system includes a first intake port opening into a combustion chamber so as to produce a turbulent flow of an fuel mixture in said combustion chamber, a second intake port opening into said combustion chamber and a valve for closing said second intake port in said range of low engine speeds.

7. A lean burn engine as defined in claim 6, and further comprising a plurality of fuel injectors provided one for each cylinder and fuel injection control means for controlling said fuel injectors to inject fuel at a specified timing on an intake stroke.

8. A lean burn engine as defined in claim 6, wherein said first intake port is configured so as to form said turbulent flow of a fuel mixture having a center line intersecting to a vertical center line of said combustion chamber at an angle between 35° and 55°.

9. A lean burn engine as defined in claim 6, wherein said air intake system is configured so that a dynamic effect of intake air is tunable at approximately a median engine speed in said lean burn range of low engine speeds and low engine loads when said second intake port is closed.

10. A lean burn engine as defined in claim 9, wherein said air intake system is configured so that a dynamic effect of intake air is tunable at an engine speed higher than speeds in said lean burn range of low engine speeds and low engine loads while said second intake port is opened.

11. A lean burn engine as defined in claim 10, wherein said air intake system further includes a surge tank and a resonance chamber having a volumetric capacity larger than said surge tank and communicating with said surge tank, said resonance chamber presenting a dynamic effect of intake air in a range of engine speeds between said engine speeds at which said dynamic effect of intake air is tunable when said second intake port is closed and when said second intake port is opened, respectively.

12. A lean burn engine as defined in claim 6, and further comprising a plurality of fuel injector provided one for each cylinder and fuel injection control means for controlling said fuel injectors to inject fuel at a specified timing on an intake stroke.

13. A lean burn engine as defined in claim 1, wherein said intake air system includes an intake valve of a slow speed type which is timed to close so as to increase charging efficiency in said range of slow engine speeds and said exhaust system includes an intake valve of a fast speed type which is timed to open so as to expedite exhausting a burned gas in a range of high engine speeds, said exhaust valve starting to open for a period from a time at which commencement of opening to bottom dead center on an exhaust stroke 10 degree in terms of crank angle longer than a period from bottom dead center on an intake stroke to a time said intake valve closes.

14. A lean burn engine as defined in claim 1, wherein said exhaust system includes an exhaust purification device having a catalyst comprising at least platinum as an active species supported by zeolite as a carrier.

15. A lean burn engine as defined in claim 14, wherein said catalyst further comprises at least one of iridium and rhodium as an activator.

16. A lean burn engine as defined in claim 1, wherein said intake air system further includes intake air control means for controlling an amount of intake air bypassing a throttle valve according to engine operating conditions of said specific range of engine operating conditions.

17. A lean burn engine as defined in claim 1, and further comprising an air mixing type of fuel injector, provided for each of a plurality of cylinders, which delivers air so as to atomize a fuel injected therethrough.

18. A lean burn engine as defined in claim 17, wherein said fuel injector is supplied with fuel vapor from a fuel vapor purge system.

19. A lean burn engine as defined in claim 1, and further comprising a plurality of fuel injectors provided one for each cylinder and fuel injection control means for controlling said fuel injectors to inject fuel at a specified timing on an intake stroke.

* * * * *

(12) REEXAMINATION CERTIFICATE (4399th)
United States Patent
Mitobe et al.

(10) Number: US 5,765,372 C1
(45) Certificate Issued: Jul. 17, 2001

(54) LEAN BURN ENGINE FOR AUTOMOBILE

(75) Inventors: Noriaki Mitobe; Isao Shimizu, both of Higashihiroshima; Kunitomo Minamitani, Kure; Yasuyoshi Hori, Kobe; Futoshi Nishioka, Hiroshima; Tetsushi Hosokai, Kure; Kenji Oka, Aki-gun; Hideshi Terao, Higashihiroshima; Misao Fujimoto, Higashihiroshima; Masaki Harada, Higashihiroshima, all of (JP)

(73) Assignee: Mazda Motor Corporation, Hiroshima-ken (JP)

Reexamination Request:
No. 90/005,716, Apr. 28, 2000

Reexamination Certificate for:
Patent No.: 5,765,372
Issued: Jun. 16, 1998
Appl. No.: 08/523,675
Filed: Sep. 5, 1995

(30) Foreign Application Priority Data

Sep. 6, 1994 (JP) .................................... 6-239436
Mar. 17, 1995 (JP) .................................... 7-059397

(51) Int. Cl.⁷ ...................................................... F01N 3/10
(52) U.S. Cl. ................................ 60/301; 60/285; 60/313; 123/184.53; 123/585
(58) Field of Search .............................. 60/301, 313, 285, 60/286, 297; 123/184.53, 585

(56) References Cited

U.S. PATENT DOCUMENTS

| | | |
|---|---|---|
| 4,760,044 | 7/1988 | Joy et al. . |
| 5,144,932 | 9/1992 | Miyashita et al. . |
| 5,357,749 | 10/1994 | Ohsuga et al. . |
| 5,450,824 | 9/1995 | Yamane et al. . |
| 5,501,074 * | 3/1996 | Suetsuga et al. ................ 60/285 |
| 5,765,372 | 6/1998 | Mitobe et al. . |

FOREIGN PATENT DOCUMENTS

| | | |
|---|---|---|
| 42 15 942 | 12/1992 | (DE) . |
| 0 451 462 | 10/1991 | (EP) . |
| 0 555 870 | 8/1993 | (EP) . |
| 4-246249 | 9/1992 | (JP) . |

* cited by examiner

*Primary Examiner*—Thomas E Denion

(57) ABSTRACT

A lean burn engine adapted to establish a specified air-fuel ratio leaner by predetermined rate than a stoichiometric air-fuel ratio in a range of low engine speeds and low engine loads is provided with an air intake system of a low speed type which provides a high charging efficiency in a range of low engine speeds and an exhaust system capable of eliminating a nitrogen oxide emission in the exhaust even during lean burning.

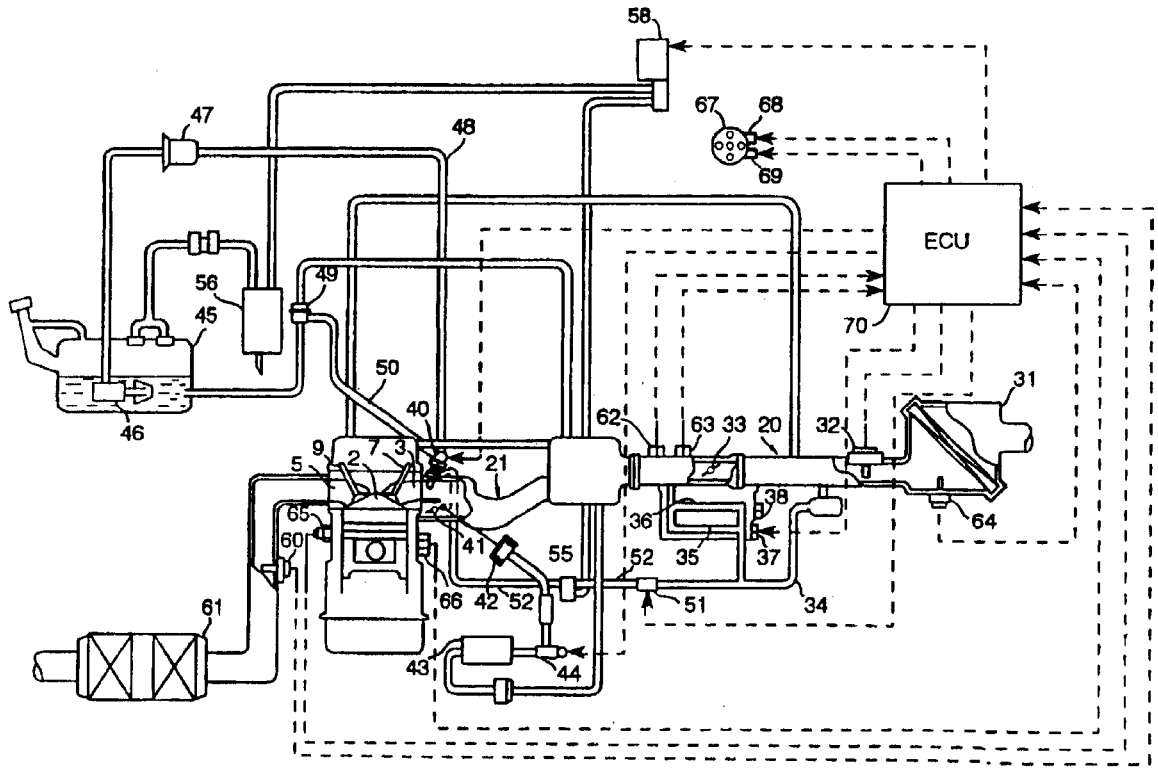

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1, 7–9, 12, 15 and 16 are determined to be patentable as amended.

Claims 2–5, 10, 11, 13, 14 and 17–19, dependent on an amended claim, are determined to be patentable.

1. A lean burn engine for an automobile which establishes a specified air-fuel ratio, in a lean burn range of low engine speeds and low engine loads, leaner by a predetermined rate than a stoichiometric air-fuel ratio so as to produce a nitrogen oxide emission with a proportion in the exhaust sufficiently less than a predetermined level and causes a change in output torque less than a permissible level and, in a range of high engine loads, an air-fuel ratio equal to or richer than said stoichiometric air-fuel ratio, said lean burn engine comprising:
   an air intake system of a low speed type which causes an increase in charging efficiency in a range of low engine speeds, *said intake system including a first intake port opening into a combustion chamber so as to produce a turbulent flow of an fuel mixture in said combustion chamber, a second intake port opening into said combustion chamber and a valve for closing said second intake port in said range of low engine speeds*; and
   an exhaust system capable of eliminating the nitrogen oxide emission in the exhaust produced during lean burning at air-fuel ratios leaner than said stoichiometric air-fuel ratio;
   said lean burn engine further establishing an air-fuel ratio leaner in a specified range of engine operating conditions in which engine loads are higher than those in a range of low engine loads in which a specified air-fuel ratio is established and to become gradually small within a specified extent with an increase in engine load at a side of higher engine loads in said specified range of engine operating conditions.

7. A lean burn engine as defined in claim [6] *1*, and further comprising a plurality of fuel injectors provided one for each cylinder and fuel injection control means for controlling said fuel injectors to inject fuel at a specified timing on an intake stroke.

8. A lean burn engine as defined in claim [6] *1*, wherein said first intake port is configured so as to form said turbulent flow of a fuel mixture having a center line intersecting to a vertical center line of said combustion chamber at an angle between 35° and 55°.

9. A lean burn engine as defined in claim [6] *1*, wherein said air intake system is configured so that a dynamic effect of intake air is tunable at approximately a median engine speed in said lean burn range of low engine speeds and low engine loads when said second intake port is closed.

12. A lean burn engine as defined in claim [6] *1*, and further comprising a plurality of fuel injector provided one for each cylinder and fuel injection control means for controlling said fuel injectors to inject fuel at a specified timing on an intake stroke.

15. A lean burn engine as defined in claim 14, wherein said catalyst further comprises at least one of iridium and rhodium as an [activator] *active species*.

16. A lean burn engine as defined in claim 1, wherein said intake air system further includes intake air control means for controlling an amount of intake air bypassing a throttle valve according to engine operating conditions of said [specific] *specified* range of engine operating conditions.

\* \* \* \* \*